United States Patent [19]
Waclawski et al.

[11] Patent Number: 6,128,628
[45] Date of Patent: *Oct. 3, 2000

[54] META DATA PROCESSING FOR CONVERTING PERFORMANCE DATA INTO A GENERIC FORMAT

[75] Inventors: Anthony C. Waclawski; Bruce C. Bryan, both of Colorado Springs, Colo.

[73] Assignee: MCI Communication Corporation, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 09/031,965

[22] Filed: Feb. 27, 1998

[51] Int. Cl.[7] .................................................. G06F 17/30
[52] U.S. Cl. ................................. 707/203; 707/10; 707/7
[58] Field of Search .......................... 707/1, 10, 4, 201, 707/7, 203; 395/200.48; 709/218

[56] References Cited

U.S. PATENT DOCUMENTS

| | | | |
|---|---|---|---|
| 4,791,558 | 12/1988 | Chaitin et al. | 364/200 |
| 4,979,169 | 12/1990 | Almond et al. | 370/99 |
| 5,030,951 | 7/1991 | Eda et al. | 341/100 |
| 5,206,946 | 4/1993 | Brunk | 707/101 |
| 5,461,488 | 10/1995 | Witek | 358/402 |
| 5,463,772 | 10/1995 | Thompson et al. | 707/101 |
| 5,566,161 | 10/1996 | Hartmann et al. | 370/15 |
| 5,566,332 | 10/1996 | Adair et al. | 395/600 |
| 5,627,997 | 5/1997 | Pearson et al. | 395/500 |
| 5,638,517 | 6/1997 | Bartek et al. | 395/200.18 |
| 5,790,793 | 8/1998 | Higley | 395/200.48 |
| 5,794,234 | 8/1998 | Church et al. | 707/4 |
| 5,845,283 | 12/1998 | Williams et al. | 707/101 |
| 5,848,415 | 12/1998 | Guck | 707/10 |
| 5,884,324 | 3/1999 | Cheng et al. | 707/201 |

OTHER PUBLICATIONS

Schmitz et al., A Program Generator to Generate Conversion Programs for Test Patterns, Intrumentation and Measurement Technology Conference, 1992. IMTC '92., 9th IEEE, pp. 165–168, May 1992.

Sugawa et al., An Area Efficient Hardware Sharing Filter Generator for Integration of Multiple Video Format Conversions, Consumer Electronics, 1997. Diggest of Technical Papers. ICCE., International Conference, pp. 414–415, Jun. 1997.

Lee et al., Design of a Scan Format Converter Using the Bisigmoidal Interpolation, consumer Electronics, IEEE Transactions, pp. 115–1121, Jun. 1998.

Lee et al: Design of Scan Fromat Converter Using the Bisigmoidal Interpolation; Consumer Electronics, IEEE Transactions; Jun. 1998; vol. 44 Issue 3, pp. 848–853.

Borghoff et al; Constraint–based Protocols for Distributed Problem Solving; Science of Computer Prgramming, vol. 30, Issue 1–2, Jan. 1998, pp. 201–225.

Sugawa et al; An Area Efficient Hardware Sharing Filter Generator Suitable for Multiple Video Format Conversion; Consumer Electronics, IEEE Transactions; Aug, 1997, vol. 43 Issue 3, pp. 1115–1121.

*Primary Examiner*—Thomas G. Black
*Assistant Examiner*—Frantz Coby

[57] ABSTRACT

A system and method for processing performance metric data and converting the data from Universal/Uniform Data Format (UDF) to a form readable by data analysis/reporting tools such as SAS IT Service Vision. Performance metric data is collected by collection agents in UDF files. Universal/Uniform Data Format files produced by the same type of collection agent are reformatted and mapped to a dataset having a number of records or observations. The datasets are sorted by grouping the records according to a characteristic such as an attribute and performance data tables are constructed from the sorted datasets in the form of SAS datasets. The SAS datasets may be read by data analysis/reporting tools that use the datasets to produce charts and graphs of computer system performance for display.

38 Claims, 40 Drawing Sheets

,,normet09,DISK,c10t10d0,DSKMsps,1997-12-01 06:07:23,1
,,normet09,DISK,c10t10d0,DSKMsps,1997-12-01 06:12:24,1
,,normet09,DISK,c10t10d0,DSKMsps,1997-12-01 06:17:23,1
,,normet09,DISK,c10t10d0,DSKMsps,1997-12-01 06:22:23,1
,,normet09,DISK,c10t10d0,DSKMsps,1997-12-01 06:27:24,1
,,normet09,DISK,c10t10d0,DSKMsps,1997-12-01 06:32:23,1
,,normet09,DISK,c10t2d0,DSKMsps,1997-12-01 06:02:23,1
,,normet09,DISK,c10t2d0,DSKMsps,1997-12-01 06:07:23,1
,,normet09,DISK,c10t2d0,DSKMsps,1997-12-01 06:37:24,1
,,normet09,DISK,c10t2d0,DSKMsps,1997-12-01 06:47:24,1
,,normet09,DISK,c10t2d0,DSKMsps,1997-12-01 06:52:24,1
,,normet09,DISK,c10t2d0,DSKMsps,1997-12-01 06:57:24,1
,,normet09,FILESYSTEM,root,FSCapacity,1997-12-01 06:00:47,21
,,normet09,FILESYSTEM,root,FSCapacity,1997-12-01 06:02:49,21
,,normet09,FILESYSTEM,root,FSCapacity,1997-12-01 06:04:50,21
,,normet09,FILESYSTEM,root,FSCapacity,1997-12-01 06:06:52,21
,,normet09,FILESYSTEM,root,FSCapacity,1997-12-01 06:08:53,21
,,normet09,FILESYSTEM,root,FSCapacity,1997-12-01 06:10:54,21
,,normet09,FILESYSTEM,root,FSCapacity,1997-12-01 06:12:55,21
,,normet09,FILESYSTEM,root,FSCapacity,1997-12-01 06:14:56,21
,,normet09,FILESYSTEM,root,FSCapacity,1997-12-01 06:16:57,21
,,normet09,FILESYSTEM,root,FSCapacity,1997-12-01 06:18:58,21
,,normet09,FILESYSTEM,root,FSCapacity,1997-12-01 06:21:00,21
,,normet09,FILESYSTEM,root,FSCapacity,1997-12-01 06:23:01,21
,,normet09,FILESYSTEM,root,FSCapacity,1997-12-01 06:25:02,21
,,normet09,FILESYSTEM,root,FSCapacity,1997-12-01 06:27:03,21
,,normet09,FILESYSTEM,root,FSCapacity,1997-12-01 06:29:04,21
,,normet09,FILESYSTEM,root,FSCapacity,1997-12-01 06:31:05,21
,,normet09,FILESYSTEM,root,FSCapacity,1997-12-01 06:33:06,21
,,normet09,FILESYSTEM,root,FSCapacity,1997-12-01 06:35:07,21
,,normet09,FILESYSTEM,root,FSCapacity,1997-12-01 06:37:08,21
,,normet09,FILESYSTEM,root,FSCapacity,1997-12-01 06:39:09,21
,,normet09,FILESYSTEM,root,FSCapacity,1997-12-01 06:41:10,21
,,normet09,FILESYSTEM,root,FSCapacity,1997-12-01 06:43:11,21
,,normet09,FILESYSTEM,root,FSCapacity,1997-12-01 06:45:12,21
,,normet09,FILESYSTEM,root,FSCapacity,1997-12-01 06:47:14,21
,,normet09,FILESYSTEM,root,FSCapacity,1997-12-01 06:49:14,21
,,normet09,FILESYSTEM,root,FSCapacity,1997-12-01 06:51:15,21
,,normet09,SMP,CPU_3,SMPIdlePercent,1997-12-01 05:59:11,98
,,normet09,SMP,CPU_3,SMPIdlePercent,1997-12-01 05:59:51,77
,,normet09,SMP,CPU_3,SMPIdlePercent,1997-12-01 06:00:31,91
,,normet09,SMP,CPU_3,SMPIdlePercent,1997-12-01 06:01:11,75
,,normet09,SMP,CPU_3,SMPIdlePercent,1997-12-01 06:01:51,90

FIG. 2A

```
„normet09,SMP,CPU_3,SMPIdlePercent,1997-12-01 06:02:31,64
„normet09,SMP,CPU_3,SMPIdlePercent,1997-12-01 06:03:11,90
„normet09,FILESYSTEM,root,FSCapacity,1997-12-01 06:21:00,21
„normet09,FILESYSTEM,root,FSCapacity,1997-12-01 06:23:01,21
„normet09,FILESYSTEM,root,FSCapacity,1997-12-01 06:25:02,21
„normet09,FILESYSTEM,root,FSCapacity,1997-12-01 06:27:03,21
„normet09,FILESYSTEM,root,FSCapacity,1997-12-01 06:31:05,21
„normet09,FILESYSTEM,root,FSCapacity,1997-12-01 06:33:06,21
„normet09,FILESYSTEM,root,FSCapacity,1997-12-01 06:35:07,21
„normet09,FILESYSTEM,root,FSCapacity,1997-12-01 06:37:08,21
„normet09,FILESYSTEM,root,FSCapacity,1997-12-01 06:39:09,21
„normet09,FILESYSTEM,root,FSCapacity,1997-12-01 06:41:10,21
„normet09,FILESYSTEM,root,FSCapacity,1997-12-01 06:43:11,21
„normet09,FILESYSTEM,root,FSCapacity,1997-12-01 06:45:12,21
„normet09,FILESYSTEM,root,FSCapacity,1997-12-01 06:47:14,21
„normet09,FILESYSTEM,root,FSCapacity,1997-12-01 06:49:14,21
„normet09,FILESYSTEM,root,FSCapacity,1997-12-01 06:51:15,21
„normet09,SMP,CPU_3,SMPIdlePercent,1997-12-01 05:59:11,98
„normet09,SMP,CPU_3,SMPIdlePercent,1997-12-01 05:59:51,77
„normet09,SMP,CPU_3,SMPIdlePercent,1997-12-01 06:00:31,91
„normet09,SMP,CPU_3,SMPIdlePercent,1997-12-01 06:01:11,75
„normet09,SMP,CPU_3,SMPIdlePercent,1997-12-01 06:01:51,90
„normet09,FILESYSTEM,root,FSCapacity,1997-12-01 06:21:00,21
„normet09,FILESYSTEM,root,FSCapacity,1997-12-01 06:23:01,21
„normet09,FILESYSTEM,root,FSCapacity,1997-12-01 06:25:02,21
„normet09,FILESYSTEM,root,FSCapacity,1997-12-01 06:27:03,21
„normet09,FILESYSTEM,root,FSCapacity,1997-12-01 06:29:04,21
„normet09,FILESYSTEM,root,FSCapacity,1997-12-01 06:31:05,21
„normet09,FILESYSTEM,root,FSCapacity,1997-12-01 06:33:06,21
„normet09,FILESYSTEM,root,FSCapacity,1997-12-01 06:35:07,21
„normet09,FILESYSTEM,root,FSCapacity,1997-12-01 06:37:08,21
„normet09,FILESYSTEM,root,FSCapacity,1997-12-01 06:39:09,21
„normet09,FILESYSTEM,root,FSCapacity,1997-12-01 06:41:10,21
„normet09,FILESYSTEM,root,FSCapacity,1997-12-01 06:43:11,21
„normet09,FILESYSTEM,root,FSCapacity,1997-12-01 06:45:12,21
„normet09,FILESYSTEM,root,FSCapacity,1997-12-01 06:47:14,21
„normet09,FILESYSTEM,root,FSCapacity,1997-12-01 06:49:14,21
„normet09,FILESYSTEM,root,FSCapacity,1997-12-01 06:51:15,21
„normet09,SMP,CPU_3,SMPIdlePercent,1997-12-01 05:59:11,98
„normet09,SMP,CPU_3,SMPIdlePercent,1997-12-01 05:59:51,77
„normet09,SMP,CPU_3,SMPIdlePercent,1997-12-01 06:00:31,91
„normet09,SMP,CPU_3,SMPIdlePercent,1997-12-01 06:01:11,75
„normet09,SMP,CPU_3,SMPIdlePercent,1997-12-01 06:01:51,90
...skipping...
„normet09,FILESYSTEM,root,FSCapacity,1997-12-01 06:21:00,21
```

FIG. 2B

,,normet09,FILESYSTEM,root,FSCapacity,1997-12-01 06:23:01,21
,,normet09,FILESYSTEM,root,FSCapacity,1997-12-01 06:25:02,21
,,normet09,FILESYSTEM,root,FSCapacity,1997-12-01 06:27:03,21
,,normet09,FILESYSTEM,root,FSCapacity,1997-12-01 06:29:04,21
,,normet09,FILESYSTEM,root,FSCapacity,1997-12-01 06:31:05,21
,,normet09,FILESYSTEM,root,FSCapacity,1997-12-01 06:33:06,21
,,normet09,FILESYSTEM,root,FSCapacity,1997-12-01 06:35:07,21
,,normet09,FILESYSTEM,root,FSCapacity,1997-12-01 06:37:08,21
,,normet09,FILESYSTEM,root,FSCapacity,1997-12-01 06:39:09,21
,,normet09,FILESYSTEM,root,FSCapacity,1997-12-01 06:41:10,21
,,normet09,FILESYSTEM,root,FSCapacity,1997-12-01 06:43:11,21
,,normet09,FILESYSTEM,root,FSCapacity,1997-12-01 06:45:12,21
,,normet09,FILESYSTEM,root,FSCapacity,1997-12-01 06:47:14,21
,,normet09,FILESYSTEM,root,FSCapacity,1997-12-01 06:49:14,21
,,normet09,FILESYSTEM,root,FSCapacity,1997-12-01 06:51:15,21
,,normet09,SMP,CPU_3,SMPIdlePercent,1997-12-01 05:59:11,98
,,normet09,SMP,CPU_3,SMPIdlePercent,1997-12-01 05:59:51,77
,,normet09,SMP,CPU_3,SMPIdlePercent,1997-12-01 06:00:31,91
,,normet09,SMP,CPU_3,SMPIdlePercent,1997-12-01 06:01:11,75
,,normet09,SMP,CPU_3,SMPIdlePercent,1997-12-01 06:01:51,90
,,normet09,SMP,CPU_3,SMPIdlePercent,1997-12-01 06:02:31,64
,,normet09,SMP,CPU_3,SMPIdlePercent,1997-12-01 06:03:11,90
,,normet09,SMP,CPU_3,SMPIdlePercent,1997-12-01 06:03:51,92
,,normet09,SMP,CPU_3,SMPIdlePercent,1997-12-01 06:04:31,86
,,normet09,SMP,CPU_3,SMPIdlePercent,1997-12-01 06:05:11,92
,,normet09,SMP,CPU_3,SMPIdlePercent,1997-12-01 06:05:51,82
,,normet09,SMP,CPU_3,SMPIdlePercent,1997-12-01 06:06:31,98
,,normet09,SMP,CPU_3,SMPIdlePercent,1997-12-01 06:07:11,90
,,normet09,SMP,CPU_3,SMPIdlePercent,1997-12-01 06:07:51,96
,,normet09,SMP,CPU_3,SMPIdlePercent,1997-12-01 06:08:31,97
,,normet09,SMP,CPU_3,SMPIdlePercent,1997-12-01 06:09:11,78
,,normet09,SMP,CPU_3,SMPIdlePercent,1997-12-01 06:09:51,97
,,normet09,SMP,CPU_3,SMPIdlePercent,1997-12-01 06:10:31,86
,,normet09,SMP,CPU_3,SMPIdlePercent,1997-12-01 06:11:11,97
,,normet09,SMP,CPU_3,SMPIdlePercent,1997-12-01 06:11:51,89
,,normet09,SMP,CPU_3,SMPIdlePercent,1997-12-01 06:12:31,94
,,normet09,SMP,CPU_3,SMPIdlePercent,1997-12-01 06:13:11,99
,,normet09,SMP,CPU_3,SMPIdlePercent,1997-12-01 06:13:51,79
,,normet09,SMP,CPU_3,SMPIdlePercent,1997-12-01 06:14:31,98
,,normet09,SMP,CPU_3,SMPIdlePercent,1997-12-01 06:15:11,72
,,normet09,SMP,CPU_3,SMPIdlePercent,1997-12-01 06:15:51,100
,,normet09,SMP,CPU_3,SMPIdlePercent,1997-12-01 06:16:31,99
,,normet09,SMP,CPU_3,SMPIdlePercent,1997-12-01 06:17:11,80
,,normet09,SMP,CPU_3,SMPIdlePercent,1997-12-01 06:17:52,99
,,normet09,SMP,CPU_3,SMPIdlePercent,1997-12-01 06:18:31,90

FIG. 2C

,,normet09,SMP,CPU_3,SMPIdlePercent,1997-12-01 06:19:11,96
,,normet09,SMP,CPU_3,SMPIdlePercent,1997-12-01 06:19:52,84
,,normet09,SMP,CPU_3,SMPIdlePercent,1997-12-01 06:20:31,94
,,normet09,SMP,CPU_3,SMPIdlePercent,1997-12-01 06:21:12,99
,,normet09,SMP,CPU_3,SMPIdlePercent,1997-12-01 06:21:52,89
,,normet09,SMP,CPU_3,SMPIdlePercent,1997-12-01 06:22:32,99
,,normet09,SMP,CPU_3,SMPIdlePercent,1997-12-01 06:23:12,86
,,normet09,SMP,CPU_3,SMPIdlePercent,1997-12-01 06:23:52,100
,,normet09,SMP,CPU_3,SMPIdlePercent,1997-12-01 06:24:32,99
,,normet09,SMP,CPU_3,SMPIdlePercent,1997-12-01 06:25:12,82
,,normet09,SMP,CPU_3,SMPIdlePercent,1997-12-01 06:25:52,80
,,normet09,SMP,CPU_3,SMPIdlePercent,1997-12-01 06:26:32,83
,,normet09,SMP,CPU_3,SMPIdlePercent,1997-12-01 06:27:12,99
,,normet09,SMP,CPU_3,SMPIdlePercent,1997-12-01 06:27:52,93

FIG. 2D

```
/* CHANGE LOG                                            */
/*                                                       */
/*                                                       */
/* ADDED ZONE AND QUARTER VARIABLES                      */
/*         10/28/97  BCB                                 */
/*                                                       */
/* ADDED CPORT TO THIS VERSION TO CREATE TRANSPORT DATASET.   */
/*         10/28/97  BCB                                 */
/*                                                       */ x 'cd/data1/metroinfo';
run ;
/* Read the contents of multiple files into one SAS dataset (using FILEVAR) */
/* the directory where input files live */
%let thedir=/data1/metroinfo ;
/* the prefix of files desired */
%let prelist=*_1987_120223* ;        /* CHANGE DATE HERE DAY BEFORE */
/* the prefix of files desired */
%let thelist=*_1987_1203* ;          /* CHANGE DATE HERE DAY WANTED */
/* the prefix of files desired */
%let postlist=*_1987_120400* ;       /* CHANGE DATE HERE NEXT DAY */
/* the actual file list we will use but build it first */
%let filelist=/data1/metroinfo/test.input;
run;
filename outlist'/data 1/metroinfo/filein.dat';
run;
/* cd to the base directory where the input files will come from */
/* x "cd &thedir"; */
%sysexec pwd;
run;
/* simple datastep to build the file list */
filename getlist pipe "ls&prelist> &filelist";
data_null_; infile getlist;
run;

/* read the file list to use in datastep with filevar */
data setup 1;
  infile "&filelist" pad missover lrecl=40;
  input filename $1-40;

filename getlist pipe "ls &thelist> &filelist";
data_null_; infile getlist;
run;

/* read the file list to use in datastep with filevar */
data setup2;
  infile "&filelist" pad missover lrecl=40;
  input filename $1-40;

filename getlist pipe "ls &postlist > &filelist";
data_null_; infile getlist;
run;
```

FIG. 7A

```
/* read the file list to use in datastep with filevar */
data setup3;
  infile "&filelist" pad missover lrecl=40;
  input filename $1-40;
run;
/* Now, let's try reading those new little files */
run ;
data _null_;
file outlist new notitles noprint;
  put @ I 'CARDS;' ;
run;

data testit;
file outlist mod notitles noprint;
  set setup1 setup2 setup3;
  put @1 filename;
run;
OPTIONS PS=35 LS=126 NODATE;
LIBNAME CP '/data1/metroinfo';
FILENAME DATAIN '/data1/metroinfo/filein.dat' ;
RUN ;
DATA ONE ;
LENGTH READ_ALL $ 200 ;
LENGTH APP    $ 15 ;
LENGTH INSTANCE $ 35 ;
LENGTH PARM   $ 20 ;

INPUT READ_ALL $ ;
INFILE DUMMY DLM =',' MISSOVER FILEVAR=READ_ALL END=DONE;

DO UNTIL(DONE) ;

INPUT NODE     $
      APP      $
      INSTANCE $
      PARM     $
      DATEX    $ 19.
      METRIC ;

OUTPUT ;
END ;
%INCLUDE DATAIN ;
;
/* change data set name to reflect correct day */
DATA CP.DEC0397 (KEEP=NODE APP    /* CHANGE DATE HERE DAY WANTED */
  INSTANCE PARM DATE TIME HOUR METRIC DT ZONE QUARTER );
SET ONE ;
 FORMAT DATE DATE9. TIME TIME8. HOUR Z2. DT DATETIME21.2;

DATEY=SUBSTR(DATEX,1,10) ;
TIMEY=SUBSTR(DATEX,12,8) ;

DATE=INPUT(DATEY,YYMMDD10.) ;
```

FIG. 7B

```
TIME=INPUT(TIMEY,TIME8.)    ;
DT=DHMS(DATE,HOUR(TIME),MINUTE(TIME),SECOND(TIME)) ;
 IF DATE='03DEC1997'D ;    /* CHANGE DATE HERE DAY WANTED */

HOUR=HOUR(TIME);

IF WEEKDAY(DATE) IN (1, 7) THEN ZONE=3 ;
ELSE IF WEEKDAY(DATE)=6 AND HOUR >= 18 THEN ZONE=3 ;
ELSE IF HOUR >=8 AND HOUR < 18 THEN ZONE = 1 ;
ELSE ZONE=2 ;

IF MINUTE(TIME) <15 THEN QUARTER=0 ;
ELSE IF MINUTE(TIME) >=15 AND MINUTE(TIME) <30 THEN QUARTER=15 ;
ELSE IF MINUTE(TIME) >=30 AND MINUTE(TIME) <45 THEN QUARTER=30 ;
ELSE IF MINUTE(TIME) >=45 THEN QUARTER=45 ;

RUN ;

PROC SORT NODUP DATA = CP.DEC0397 ;      /* CHANGE DATE HERE DAY WANTED */
 BY NODE APP INSTANCE PARM DATE TIME HOUR;
RUN;

DATA TEMP1;
SET CP.DEC0397;       /* CHANGE DATE HERE DAY WANTED */
KEEP NODE DATE HOUR;

PROC SORT DATA = TEMP1 NODUPLICATES;
BY NODE DATE HOUR;

DATA TEMP2;
SET TEMP1;
KEEP NODE DATE HOUR COUNT;
COUNT = 1;

PROC SUMMARY DATA=TEMP2;
VAR COUNT;
BY NODE DATE;
OUTPUT SUM(COUNT)=HOURS
OUT=TEMP2(DROP=_TYPE_ _FREQ_);

PROC PRINT DATA =TEMP2 NOOBS;
RUN;

QUIT;
```

FIG. 7C

```
*********************************************************************** ;
LIBNAME CP v612 'data1/metroinfo' ;
x 'cd/data1/metroinfo' ;
run ;

DATA CP.PROCESS (KEEP=NODE APP INSTANCE PARM DATE TIME HOUR METRIC DT
DATETIME QUARTER ZONE ) ;

SET CP.NOV3097 ;

FORMAT DATE DATE9. TIME TIME10.2 HOUR Z2. DATETIME DATETIME21.2 ;

DATETIME=DHMS(DATE,HOUR(TIME),MINUTE(TIME),SECOND(TIME));

HOUR=HOUR(TIME);

IF MINUTE(TIME) <15 THEN QUARTER=0;
ELSE IF MINUTE(TIME) >=15 AND MINUTE(TIME) <30 THEN QUARTER=15 ;
ELSE IF MINUTE(TIME) >=30 AND MINUTE(TIME) <45 THEN QUARTER=30 ;
ELSE IF MINUTE(TIME) >=45 THEN QUARTER=45 ;

IF WEEKDAY(DATE) IN (1, 7) THEN ZONE=3 ;
ELSE IF WEEKDAY(DATE)=6 AND HOUR >= 18 THEN ZONE=3 ;
ELSE IF HOUR >=8 AND HOUR <18 THEN ZONE = 1 ;
ELSE ZONE=2 ;

PROC SORT DATA = CP.PROCESS ;
  BY NODE APP INSTANCE DATETIME DATE TIME HOUR;
RUN;
QUIT;
*********************************************************************** ;

* THIS DATA STEP STAGES AND GROUPS FUNCTIONALLY SIMILAR DATA INTO DISCRETE
TABLES

*********************************************************************** ;
LIBNAME CP v612 '/data1/metroinfo';
LIBNAME WORK1 v612 '/data2/temp';

DATA ACT1 CPU1 DSK1 FS1 KER1 MEM1 NET1 NFS1 ORA1 PA1 PROC1
    SMP1 SWP1 SYB1 SDB1 USR1 ;

SET CP.PROCESS ;

IF APP = 'ACTIVEPROCESS' THEN OUTPUT ACT1;
  ELSE IF APP = 'CPU'          THEN OUTPUT CPU1 ;
  ELSE IF APP = 'DISK'         THEN OUTPUT DSK1 ;
  ELSE IF APP = 'FILESYSTEM'   THEN OUTPUT FS1 ;
  ELSE IF APP = 'KERNEL'       THEN OUTPUT KER1 ;
  ELSE IF APP = 'MEMORY'       THEN OUTPUT MEM1 ;
  ELSE IF APP = 'NETWORK'      THEN OUTPUT NET1 ;
  ELSE IF APP = 'NFS'          THEN OUTPUT NFS1 ;
```

FIG. 8A

```
ELSE IF APP = 'ORACLE7'      THEN OUTPUT ORA1 ;
ELSE IF APP = 'PATROLAGENT'  THEN OUTPUT PA1 ;
ELSE IF APP = 'PROCESS'      THEN OUTPUT PROC1 ;
ELSE IF APP = 'SMP'          THEN OUTPUT SMP1 ;
ELSE IF APP = 'SWAP'         THEN OUTPUT SWP1 ;
ELSE IF APP = 'SYBASE10'     THEN OUTPUT SYB1 ;
ELSE IF APP = 'SYBASE10DB'   THEN OUTPUT SDB1 ;
ELSE IF APP = 'USER'         THEN OUTPUT USR1 ;

*************************************************************************** ;

* BUILD THE Active Process PERFORMANCE DATA TABLE

*************************************************************************** ;
DATA ACT ;
SET ACT1 ;
  KEEP
      APP DATE DATETIME HOUR INSTANCE NODE PARM QUARTER TIME
      ACTPCPUP ACTPCCTM ACTPRDCP ACTPMMEM ACTPMEMW ACTPRRNK ;

LENGTH ACTPMEMW $15 ;

IF PARM= 'ACTPRCPUPerc'     THEN ACTPCPUP = METRIC ;
  ELSE IF PARM='ACTPRCPUTime'    THEN ACTPCCTM = METRIC ;
  ELSE IF PARM='ACTPRDeltaCPU'   THEN ACTPRDCP = METRIC ;
  ELSE IF PARM='ACTPRMem'        THEN ACTPMMEM = METRIC ;
  ELSE IF PARM='ACTPRMemWait'    THEN ACTPMEMW = METRIC ;
  ELSE IF PARM='ACTPRRank'       THEN ACTPRRNK = METRIC ;

ATTRIB DATETIME LABEL = 'Date Time Stamp'                    FORMAT = DATETIME21.2 ;
ATTRIB DATE     LABEL = 'Date'                               FORMAT = DATE9.     ;
ATTRIB TIME     LABEL = 'Time'                               FORMAT = TIME10.2   ;
ATTRIB HOUR     LABEL = 'Hour'                               FORMAT = Z2.        ;
ATTRIB QUARTER  LABEL = 'Quarter'                            FORMAT = BEST12.    ;
ATTRIB INSTANCE LABEL = 'Instance'                           LENGTH = $35        ;
ATTRIB APP      LABEL = 'Application'                        LENGTH = $15        ;
ATTRIB NODE     LABEL = 'Node'                               LENGTH = $8         ;
ATTRIB ACTPCPUP LABEL = 'Percent CPU utilization of process'   FORMAT = 5.2        ;
ATTRIB ACTPCCTM LABEL = 'Accumulated CPU time used by process' FORMAT = TIME11.2 ;
ATTRIB ACTPRDCP LABEL = 'Change in CPU time since last interval' FORMAT = BEST12.  ;
/* STORED AS A COUNT */
ATTRIB ACTPMMEM LABEL = 'Memory used by process'             FORMAT = BEST12.    ;
ATTRIB ACTPMEMW LABEL = 'Active process waiting for memory'  LENGTH = $15        ;
ATTRIB ACTPRRNK LABEL = 'Ranking of active processes (Top 10)' FORMAT = BEST12.  ;

RUN ;

PROC SUMMARY DATA = ACT ;
BY NODE APP INSTANCE DATETIME DATE TIME HOUR;
ID QUARTER ACTPMEMW ;
VAR ACTPCPUP ACTPCCTM ACTPRDCP ACTPMMEM ACTPRRNK ;
OUTPUT OUT= ACT
MEAN=ACTPCPUP ACTPCCTM ACTPRDCP ACTPMMEM ACTPRRNK ;
```

FIG. 8B

```
*************************************************************************;
* BUILD THE CPU PERFORMANCE DATA TABLE
*************************************************************************;
DATA CPU ;
SET CPU1 ;
 KEEP
      APP DATE DATETIME HOUR INSTANCE NODE PARM QUARTER TIME
      CPUTIL CPIDLETM CPUINT CPULOAD CPUPSWCH CPRUNQSZ
      CPSYSTM CPUSERTM CPUWIO CPUWSWP ;

IF PARM= 'CPUCpuUtil'      THEN CPUTIL = METRIC ;
ELSE IF PARM= 'CPUIdleTime'    THEN CPIDLETM = METRIC ;
ELSE IF PARM= 'CPUInt'        THEN CPUINT = METRIC ;
ELSE IF PARM= 'CPULoad'       THEN CPULOAD = METRIC ;
ELSE IF PARM= 'CPUProcSwch'    THEN CPUPSWCH = METRIC ;
ELSE IF PARM= 'CPURunQSize'    THEN CPRUNQSZ = METRIC ;
ELSE IF PARM= 'CPUSysTime'    THEN CPSYSTM = METRIC ;
ELSE IF PARM= 'CPUUserTime'    THEN CPUSERTM = METRIC ;
ELSE IF PARM= 'CPUWio'        THEN CPUWIO = METRIC ;
ELSE IF PARM= 'CPUWSwp'       THEN CPUWSWP = METRIC ;

ATTRIB DATETIME LABEL = 'Date Time Stamp'              FORMAT = DATETIME21.2 ;
ATTRIB DATE    LABEL = 'Date'                         FORMAT = DATE9.      ;
ATTRIB TIME    LABEL = 'Time'                         FORMAT = TIME10.2    ;
ATTRIB HOUR    LABEL = 'Hour'                         FORMAT = Z2.         ;
ATTRIB QUARTER  LABEL = 'Quarter'                      FORMAT = BEST12.     ;
ATTRIB INSTANCE LABEL = 'Instance'                     LENGTH = $35         ;
ATTRIB APP     LABEL = 'Application'                   LENGTH = $15         ;
ATTRIB NODE    LABEL = 'Node'                         LENGTH = $8          ;
ATTRIB CPUTIL   LABEL = 'Percent CPU utilization'         FORMAT = 5.2         ;
ATTRIB CPIDLETM LABEL = 'Percent of time CPU was Idle'    FORMAT = 5.2         ;
ATTRIB CPUINT  LABEL = 'Number of non-VME interrupts'     FORMAT = BEST12.     ;
ATTRIB CPULOAD LABEL = '1 minte CPU load average'         FORMAT = BEST12.2    ;
ATTRIB CPUPSWCH LABEL = 'Number of CPU Context switches'   FORMAT = BEST12.     ;
ATTRIB CPRUNQSZ LABEL = 'Average number of processes running'  FORMAT = BEST12.    ;
/* STORED AS A COUNT */
ATTRIB CPSYSTM LABEL = 'Percent of CPU time spent in system mode'  FORMAT = 5.2  ;
ATTRIB CPUSERTM LABEL = 'Percent of CPU time spent in user mode'   FORMAT = 5.2  ;
ATTRIB CPUWIO  LABEL = 'Percent of CPU time waiting for I/O'      FORMAT = 5.2  ;
ATTRIB CPUWSWP LABEL = 'Percent of CPU time waiting for swap I/O'  FORMAT = 5.2  ;

RUN;

PROC SUMMARY DATA = CPU ;
BY NODE APP INSTANCE DATETIME DATE TIME HOUR;
ID QUARTER ;
VAR CPUTIL CPIDLETM CPUINT CPULOAD CPUPSWCH CPRUNQSZ
    CPSYSTM CPUSERTM CPUWIO CPUWSWP ;
OUTPUT OUT= CPU
MEAN=CPUTIL CPIDLETM CPUINT CPULOAD CPUPSWCH CPRUNQSZ
```

FIG. 8C

CPSYSTM CPUSERTM CPUWIO CPUWSWP ;

RUN ;
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* ;

\* BUILD THE DISK PERFORMANCE DATA TABLE

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* ;

DATA DSK ;
SET DSK1 ;
  KEEP
     APP DATE DATETIME HOUR INSTANCE NODE PARM QUARTER TIME
     DSKAVGQ DSKAVGST DSKAVGWT DSKBPS  DSKMSPS DSKPCBSY
     DSKREAD DSKRDWRT DSKSPS  DSKTPS  DSKWRITE ;

IF PARM= 'DSKAvgQueue'       THEN DSKAVGQ = METRIC ;
ELSE IF PARM= 'DSKAvgServ'     THEN DSKAVGST = METRIC ;
ELSE IF PARM= 'DSKAvgWait'     THEN DSKAVGWT = METRIC ;
ELSE IF PARM= 'DSKBps'         THEN DSKBPS = METRIC ;
ELSE IF PARM= 'DSKMsps'        THEN DSKMSPS = METRIC ;
ELSE IF PARM= 'DSKPercentBusy'   THEN DSKPCBSY = METRIC ;
ELSE IF PARM= 'DSKRead'        THEN DSKREAD = METRIC ;
ELSE IF PARM= 'DSKReadWrite'   THEN DSKRDWRT = METRIC ;
ELSE IF PARM= 'DSKSps'         THEN DSKSPS = METRIC ;
ELSE IF PARM= 'DSKTps'         THEN DSKTPS = METRIC ;
ELSE IF PARM= 'DSKWrite'       THEN DSKWRITE = METRIC ;

ATTRIB DATETIME LABEL = 'Date Time Stamp'      FORMAT = DATETIME21.2 ;
ATTRIB DATE   LABEL = 'Date'               FORMAT = DATE9.   ;
ATTRIB TIME   LABEL = 'Time'               FORMAT = TIME10.2  ;
ATTRIB HOUR  LABEL = 'Hour'                FORMAT = Z2.    ;
ATTRIB QUARTER LABEL = 'Quarter'           FORMAT = BEST12.   ;
ATTRIB INSTANCE LABEL = 'Instance'          LENGTH = $35     ;
ATTRIB APP    LABEL = 'Application'          LENGTH = $15     ;
ATTRIB NODE  LABEL = 'Node'                LENGTH = $8      ;
ATTRIB DSKAVGQ LABEL =  'Average number disk I/O requests'    FORMAT = BEST12.2  ;
ATTRIB DSKAVGST LABEL = 'Average service time in ms'        FORMAT = TIME11.2  ;
ATTRIB DSKAVGWT LABEL = 'Average time requests wait in queue'  FORMAT = TIME12.2  ;
ATTRIB DSKBPS LABEL = '1-KB blocks read or written per second'    FORMAT = BEST12.2  ;
/\* STORED AS A RATE \*/
ATTRIB DSKMSPS LABEL = 'Average disk seek time for the device'    FORMAT = TIME12.2  ;
ATTRIB DSKPCBSY LABEL = 'Percent of time a device is busy'     FORMAT = 5.2       ;
ATTRIB DSKREAD LABEL = 'Number of disk reads per second'       FORMAT = 5.2       ;
ATTRIB DSKRDWRT LABEL = 'Number of read and write reqs to device/sec' FORMAT = 5.2 ;
ATTRIB DSKSPS LABEL = 'Number of disk seeks per second'        FORMAT = BEST12.2 ; /\*
STORED AS A RATE \*/
ATTRIB DSKTPS LABEL = 'Number of disk transfers per second'    FORMAT = BEST12.2 ; /\*
STORED AS A RATE \*/
ATTRIB DSKWRITE LABEL = 'Number of KBs written to disk per second' FORMAT = 5.2    ;

RUN ;

PROC SUMMARY DATA = DSK ;

FIG. 8D

```
BY NODE APP INSTANCE DATETIME DATE TIME HOUR;
ID QUARTER;
VAR DSKAVGQ DSKAVGST DSKAVGWT DSKBPS DSKMSPS DSKPCBSY
    DSKREAD DSKRDWRT DSKSPS DSKTPS DSKWRITE ;
OUTPUT OUT= DSK
MEAN=DSKAVGQ DSKAVGST DSKAVGWT DSKBPS DSKMSPS DSKPCBSY
    DSKREAD DSKRDWRT DSKSPS DSKTPS DSKWRITE ;

******************************************************************* ;

* BUILD THE FILE SYSTEM PERFORMANCE DATA TABLE

******************************************************************* ;

DATA FS ;
SET FS1 ;
  KEEP
      APP DATE DATETIME HOUR INSTANCE NODE PARM QUARTER TIME
      FSCAPCTY FSFINODE FSINPCTU ;

IF PARM= 'FSCapacity'        THEN FSCAPCTY = METRIC ;
  ELSE IF PARM= 'FSFreeInodes'     THEN FSFINODE = METRIC ;
  ELSE IF PARM= 'FSInodeUsedPercent'  THEN FSINPCTU = METRIC ;

ATTRIB DATETIME LABEL = 'Date Time Stamp'                FORMAT = DATETIME21.2 ;
ATTRIB DATE     LABEL = 'Date'                           FORMAT = DATE9.    ;
ATTRIB TIME     LABEL = 'Time'                           FORMAT = TIME10.2  ;
ATTRIB HOUR     LABEL = 'Hour'                           FORMAT = Z2.       ;
ATTRIB QUARTER  LABEL = 'Quarter'                        FORMAT = BEST12.   ;
ATTRIB INSTANCE LABEL = 'Instance'                       LENGTH = $35       ;
ATTRIB APP      LABEL = 'Application'                    LENGTH = $15       ;
ATTRIB NODE     LABEL = 'Node'                           LENGTH = $8        ;
ATTRIB FSCAPCTY LABEL = 'Percent of file system storage in use'    FORMAT = 5.2   ;
ATTRIB FSINPCTU LABEL = 'Number of unused I-nodes on file system'  FORMAT = 5.2   ;
ATTRIB FSINPCTU LABEL = 'Percent of I-nodes used'        FORMAT = 5.2       ;

RUN ;

PROC SUMMARY DATA = FS ;
BY NODE APP INSTANCE DATETIME DATE TIME HOUR;
ID QUARTER ;
VAR FSCAPCTY FSFINODE FSINPCTU ;
OUTPUT OUT= FS
MEAN=FSCAPCTY FSFINODE FSINPCTU ;

******************************************************************* ;

* BUILD THE KERNAL PERFORMANCE DATA TABLE

******************************************************************* ;

DATA KER ;
SET KER1 ;
```

FIG. 8E

KEEP
    APP DATE DATETIME HOUR INSTANCE NODE PARM QUARTER TIME
    KERDIRBK KERFLUPC KERGNUSD KERIGET KERINUPC KERLGALC
    KERLGFAL KERLGMEM KERLUPCT KERMSG KERNAMEI KEROVALC
    KEROVFAL KERPUPCT KERSEMOP KERSMALC KERSMFAL KERSMMEM
    KERSYSCL ;

IF PARM= 'KERDirBlk'           THEN KERDIRBK = METRIC ;
ELSE IF PARM= 'KERFileUsedPercent'     THEN KERFLUPC = METRIC ;
ELSE IF PARM= 'KERGNodeUsedPercent'    THEN KERGNUSD = METRIC ;
ELSE IF PARM= 'KERIGet'            THEN KERIGET = METRIC ;
ELSE IF PARM= 'KERINodeUsedPercent'    THEN KERINUPC = METRIC ;
ELSE IF PARM= 'KERLgAlloc'         THEN KERLGALC = METRIC ;
ELSE IF PARM= 'KERLgFail'          THEN KERLGFAL = METRIC ;
ELSE IF PARM= 'KERLgMem'           THEN KERLGMEM = METRIC ;
ELSE IF PARM= 'KERLockUsedPercent'     THEN KERLUPCT = METRIC ;
ELSE IF PARM= 'KERMsg'             THEN KERMSG = METRIC ;
ELSE IF PARM= 'KERNameI'           THEN KERNAMEI = METRIC ;
ELSE IF PARM= 'KEROvzAlloc'        THEN KEROVALC = METRIC ;
ELSE IF PARM= 'KEROvzFail'         THEN KEROVFAL = METRIC ;
ELSE IF PARM= 'KERProcUsedPercent'     THEN KERPUPCT = METRIC ;
ELSE IF PARM= 'KERSemOps'          THEN KERSEMOP = METRIC ;
ELSE IF PARM= 'KERSmlAlloc'        THEN KERSMALC = METRIC ;
ELSE IF PARM= 'KERSmlFail'         THEN KERSMFAL = METRIC ;
ELSE IF PARM= 'KERSmlMem'          THEN KERSMMEM = METRIC ;
ELSE IF PARM= 'KERSysCall'         THEN KERSYSCL = METRIC ;

ATTRIB DATETIME LABEL = 'Date Time Stamp'            FORMAT = DATETIME21.2 ;
    ATTRIB DATE    LABEL = 'Date'                FORMAT = DATE9.   ;
    ATTRIB TIME    LABEL = 'Time'                FORMAT = TIME10.2  ;
    ATTRIB HOUR   LABEL = 'Hour'                  FORMAT = Z2.     ;
    ATTRIB QUARTER  LABEL = 'Quarter'                FORMAT = BEST12.    ;
    ATTRIB INSTANCE LABEL = 'Instance'               LENGTH = $35      ;
    ATTRIB APP    LABEL = 'Application'             LENGTH = $15      ;
    ATTRIB NODE   LABEL = 'Node'                LENGTH = $8       ;
    ATTRIB KERDIRBK LABEL = 'Directory blocks reads per second'      FORMAT = BEST12.2   ;
    /* STORED AS A RATE */
    ATTRIB KERFLUPC LABEL = 'Percent Kernel file slots in use'       FORMAT = 5.2      ;
    ATTRIB KERGNUSD LABEL = 'Percent of kernel file G-node slots in use'    FORMAT = BEST12.   ;
    /* STORED AS A COUNT */
    ATTRIB KERIGET LABEL = 'Number of files locate by I-Node entry'      FORMAT = BEST12.   ; /*
    STORED AS A COUNT */
    ATTRIB KERINUPC LABEL = 'Percent of kernel I-node slots used'      FORMAT = 5.2      ;
    ATTRIB KERMSG LABEL = 'Number of message operations per second'     FORMAT = BEST12.2
    ; /* STORED AS A RATE */
    ATTRIB KERLGALC LABEL = 'Area allocated in bytes for lg mem reqs'     FORMAT = BEST 12.2   ;
    /* STORED AS A RATE */
    ATTRIB KERLGFAL LABEL = 'Number of lg mem pool requests that fail'    FORMAT = BEST12.2
    ; /* STORED AS A RATE */
    ATTRIB KERLGMEM LABEL = 'Amount avail to KMA in lg mem pool in bytes'   FORMAT =
    BEST 12.2 ; /* STORED AS A RATE */
    ATTRIB KERLUPCT LABEL = 'Percent of kernel lock slots in use'      FORMAT = BEST12.2   ; /*
    STORED AS A RATE */

FIG. 8F

ATTRIB KERMSG LABEL = 'Number of message operations per second'    FORMAT = BEST12.2
; /* STORED AS A RATE */
ATTRIB KERNAMEL LABEL = 'Number of file system pathname searches'    FORMAT = BEST12.
; /* STORED AS A COUNT */
ATTRIB KEROVALC LABEL = 'Area allocated in bytes for oversize mem'    FORMAT = BEST12.2
; /* STORED AS A RATE */
ATTRIB KEROVFAL LABEL = 'Number of ovz mem pool requests that fail'    FORMAT = BEST12.2
; /* STORED AS A RATE */
ATTRIB KEROVMEM LABEL = 'Amount avail to KMA in ovz mem pool in byts'    FORMAT = BEST12.2   ; /* STORED AS A RATE */
ATTRIB KERPUPCT LABEL = 'Percentage of Kernel process slots used'    FORMAT = 5.2    ; /* CHECK TO SEE IF IT IS A COUNT */
ATTRIB KERSEMOP LABEL = 'Number of semephore operations per second'    FORMAT = BEST12.2
; /* STORED AS A RATE */
ATTRIB KERSMALC LABEL = 'Area allocated in bytes for sm mem reqs'    FORMAT = BEST12.2
; /* STORED AS A RATE */
ATTRIB KERSMFAL LABEL = 'Number of sm mem pool requests that fail'    FORMAT = BEST12.2
; /* STORED AS A RATE */
ATTRIB KERSMMEM LABEL = 'Amount avail to KMA in sm mem pool in bytes'    FORMAT = BEST 12.2   ; /* STORED AS A RATE */
ATTRIB KERSYSCL LABEL = 'Total Number of system calls per second'    FORMAT = BEST12.2
; /* STORED AS A RATE */

RUN ;

PROC SUMMARY DATA = KER ;
BY NODE APP INSTANCE DATETIME DATE TIME HOUR;
ID QUARTER ;
VAR KERDIRBK KERFLUPC KERGNUSD KERIGET KERINUPC KERLGALC
  KERLGFAL KERLGMEM KERLUPCT KERMSG KERNAMEI KEROVALC
  KEROVFAL KERPUPCT KERSEMOP KERSMALC KERSMFAL KERSMMEM
  KERSYSCL ;
OUTPUT OUT:= KER
MEAN=KERDIRBK KERFLUPC KERGNUSD KERIGET KERINUPC KERLGALC
  KERLGFAL KERLGMEM KERLUPCT KERMSG KERNAMEI KEROVALC
  KEROVFAL KERPUPCT KERSEMOP KERSMALC KERSMFAL KERSMMEM
  KERSYSCL ;

RUN ;
*************************************************************************;

* BUILD THE MEMORY PERFORMANCE DATA TABLE

*************************************************************************;

DATA MEM ;
SET MEM1 ;
  KEEP
    APP DATE DATETIME HOUR INSTANCE NODE PARM QUARTER TIME
    MEMACVPG MEMADTRF MEMALOCD MEMBFREE MEMBREAD MEMBREQ
    MEMBWRIT MEMBPREQ MEMCACHE MEMCOW MEMCOPYW MEMDFILL
    MEMFLUSH MEMFREEM MEMHPMEM MEMIDGET MEMIDPRG MEMIDWRP
    MEMLREAD MEMLWRT MEMOVRHD MEMPFALT MEMPREAD MEMPWRT
    MEMPGANT MEMPGFRD MEMPGIN MEMPGOUT MEMPSCND MEMPGFIL

FIG. 8G

MEMPGSWP MEMRCACH MEMRFALT MEMREGIN MEMRGOUT MEMREQ
MEMSTEAL MEMSWPBF MEMSYNC MEMTFALT MEMUNUSD MEMVMPRG
MEMWCACH MEMWIRE MEMZERO ;

```
        IF PARM= 'MEMActiveVirPage'      THEN MEMACVPG = METRIC ;
   ELSE IF PARM= 'MEMAddrTransFault'     THEN MEMADTRF = METRIC ;
   ELSE IF PARM= 'MEMAllocD'             THEN MEMALOCD = METRIC ;
   ELSE IF PARM= 'MEMBFree'              THEN MEMBFREE = METRIC ;
   ELSE IF PARM= 'MEMBRead'              THEN MEMBREAD = METRIC ;
   ELSE IF PARM= 'MEMBReq'               THEN MEMBREQ = METRIC ;
   ELSE IF PARM= 'MEMBWrt'               THEN MEMBWRIT = METRIC ;
   ELSE IF PARM= 'MEMBlkPerReq'          THEN MEMBPREQ = METRIC ;
   ELSE IF PARM= 'MEMCache'              THEN MEMCACHE = METRIC ;
   ELSE IF PARM= 'MEMCow'                THEN MEMCOW = METRIC ;
   ELSE IF PARM= 'MEMCpyW'               THEN MEMCOPYW = METRIC ;
   ELSE IF PARM= 'MEMDFill'              THEN MEMDFILL = METRIC ;
   ELSE IF PARM= 'MEMFlush'              THEN MEMFLUSH = METRIC ;
   ELSE IF PARM= 'MEMFreeMem'            THEN MEMFREEM = METRIC ;
   ELSE IF PARM= 'MEMHeapMem'            THEN MEMHPMEM = METRIC ;
   ELSE IF PARM= 'MEMIdGet'              THEN MEMIDGET = METRIC ;
   ELSE IF PARM= 'MEMIdPrg'              THEN MEMIDPRG = METRIC ;
   ELSE IF PARM= 'MEMIdWrp'              THEN MEMIDWRP = METRIC ;
   ELSE IF PARM= 'MEMLRead'              THEN MEMLREAD = METRIC ;
   ELSE IF PARM= 'MEMLWrt'               THEN MEMLWRT = METRIC ;
   ELSE IF PARM= 'MEMOverHd'             THEN MEMOVRHD = METRIC ;
   ELSE IF PARM= 'MEMPFault'             THEN MEMPFALT = METRIC ;
   ELSE IF PARM= 'MEMPRead'              THEN MEMPREAD = METRIC ;
   ELSE IF PAPM= 'MEMPWrt'               THEN MEMPWRT = METRIC ;
   ELSE IF PARM= 'MEMPageAnticipated'    THEN MEMPGANT = METRIC ;
   ELSE IF PARM= 'MEMPageFreed'          THEN MEMPGFRD = METRIC ;
   ELSE IF PARM= 'MEMPagein'             THEN MEMPGIN = METRIC ;
   ELSE IF PARM= 'MEMPageOut'            THEN MEMPGOUT = METRIC ;
   ELSE IF PARM= 'MEMPageScanned'        THEN MEMPSCND = METRIC ;
   ELSE IF PARM= 'MEMPgFil'              THEN MEMPGFIL = METRIC ;
   ELSE IF PARM= 'MEMPgSwp'              THEN MEMPGSWP = METRIC ;
   ELSE IF PARM= 'MEMRCache'             THEN MEMRCACH = METRIC ;
   ELSE IF PARM= 'MEMRFault'             THEN MEMRFALT = METRIC ;
   ELSE IF PARM= 'MEMRegionsIn'          THEN MEMREGIN = METRIC ;
   ELSE IF PARM= 'MEMRegionsOut'         THEN MEMRGOUT = METRIC ;
   ELSE IF PARM= 'MEMReq'                THEN MEMREQ = METRIC ;
   ELSE IF PARM= 'MEMSteal'              THEN MEMSTEAL = METRIC ;
   ELSE IF PARM= 'MEMSwpBf'              THEN MEMSWPBF = METRIC ;
   ELSE IF PARM= 'MEMSync'               THEN MEMSYNC = METRIC ;
   ELSE IF PARM= 'MEMTFault'             THEN MEMTFALT = METRIC ;
   ELSE IF PARM= 'MEMUnused'             THEN MEMUNUSD = METRIC ;
   ELSE IF PARM= 'MEMVmPrg'              THEN MEMVMPRG  = METRIC ;
   ELSE IF PARM= 'MEMWCache'             THEN MEMWCACH = METRIC ;
   ELSE IF PARM= 'MEMWire'               THEN MEMWIRE = METRIC ;
   ELSE IF PARM= 'MEMZero'               THEN MEMZERO = METRIC ;

ATTRIB DATETIME LABEL = 'Date Time Stamp'      FORMAT = DATETIME21.2 ;
   ATTRIB DATE     LABEL = 'Date'         FORMAT = DATE9.    ;
   ATTRIB TIME     LABEL = 'Time'         FORMAT = TIME10.2  ;
   ATTRIB HOUR     LABEL = 'Hour'         FORMAT = Z2.    ;
```

FIG. 8H

ATTRIB QUARTER    LABEL = 'Quarter'                              FORMAT = BEST 12. ;
ATTRIB INSTANCE   LABEL = 'Instance'                             LENGTH = $35     ;
ATTRIB APP        LABEL = 'Application'                          LENGTH = $15     ;
ATTRIB NODE       LABEL = 'Node'                                 LENGTH = $8      ;
ATTRIB MEMACVPG LABEL = 'Number of active virtual pages'         FORMAT = BEST12. ;
ATTRIB MEMADTRF LABEL = 'Number of addressrtranslationafaults'   FORMAT = BEST 12. ;
ATTRIB MEMALOCD LABEL = 'Amount of memory allocated as heap mem'  FORMAT = BEST12.
;
ATTRIB MEMBFREE LABEL = 'Amount in bytes of heap freed per second'  FORMAT = BEST12.
;
ATTRIB MEMBREAD LABEL = 'Number of mem blocks searched per requst'  FORMAT = BEST12.
;
ATTRIB MEMBREQ LABEL = 'Number of physcal reads per sec from dsk'   FORMAT = BEST12.
;
ATTRIB MEMBWRIT LABEL = 'Amount of memory reqsted per sec by heap'  FORMAT = BEST12.
;
ATTRIB MEMBPREQ LABEL = 'Number of physical writes per sec to dsk'  FORMAT = BEST12. ;
ATTRIB MEMCACHE LABEL = 'Number of cache page hits'              FORMAT = BEST 12. ;
ATTRIB MEMCOW    LABEL = 'Number of page write faults'           FORMAT = BEST 12.   ;
ATTRIB MEMCOPYW  LABEL = 'Number of faults on copy on write pages'  FORMAT = BEST12.
;
ATTRIB MEMDFILL LABEL = 'Number of page faults due to dmnd paging'  FORMAT = BEST12.
;
ATTRIB MEMFLUSH LABEL = 'Number of single processor TLB flushes/s'  FORMAT = BEST12.
;
ATTRIB MEMFREEM LABEL = 'Number of 1-KB pages of memory available'  FORMAT = BEST12.
;
ATTRIB MEMHPMEM LABEL = 'Number of 1-KB pages alloc to sys dyn hp'  FORMAT = BEST12.
;
ATTRIB MEMIDGET LABEL = 'Number of new TLB IDs issued per sec'   FORMAT = BEST12.
;
ATTRIB MEMIDPRG LABEL = 'Number of TLB IDs purged per sec'       FORMAT = BEST 12. ;
ATTRIB MEMIDWRP LABEL = 'Number of flushes/s caused by dpltd TLB'  FORMAT = BEST12.
;
ATTRIB MEMLREAD LABEL = 'Number of logical blocks read/s from buf'  FORMAT = BEST12.
;
ATTRIB MEMLWRT  LABEL = 'Number of writes/s to the system buffer'  FORMAT = BEST12. ;
ATTRIB MEMOVRHD LABEL = 'Amount of memory ovhd for heap block mgt'  FORMAT =
BEST12. ;
ATTRIB MEMPFALT LABEL = 'Aticipated short-term mem shtfl 1-KB pgs'  FORMAT = BEST12.
;
ATTRIB MEMPREAD LABEL = 'Number of 1-KB mem pgs added to pg-stl d'  FORMAT = BEST12.
;
ATTRIB MEMPWRT  LABEL = 'Number of 1-KB mein pgs swapped'        FORMAT = BEST12.
;
ATTRIB MEMPGANT LABEL = 'Number of 1-KB pgs swapped from main mem'  FORMAT =
BEST12. ;
ATTRIB MEMPGFRD LABEL = 'Number of 1-KB mem pages scanned/sec'   FORMAT = BEST12.
;
ATTRIB MEMPGIN   LABEL = 'Number of detected page protectn faults'  FORMAT = BEST12. ;
ATTRIB MEMPGOUT LABEL = 'Number of pg faults reclaimed from fs'   FORMAT = BEST 12. ;
ATTRIB MEMPSCND LABEL = 'Number of pg faults reclaimed from swap'  FORMAT = BEST12.
;

FIG. 8I

ATTRIB MEMPGFIL LABEL = 'Number of raw reads/sec from char device'     FORMAT = BEST12.
;
ATTRIB MEMPGSWP LABEL = 'Number of raw writes/sec to char device'     FORMAT = BEST12.
;
ATTRIB MEMRCACH LABEL = 'Percent of I reads in the buffer cache'     FORMAT = 5.2     ;
ATTRIB MEMRFALT  LABEL = 'Number of 1-KB mem pgs swaped in'     FORMAT = BEST12.
;
ATTRIB MEMREGIN LABEL = 'Number of 1-KB mem pgs swaped out'     FORMAT = BEST12.
;
ATTRIB MEMRGOUT LABEL = 'Number of mem alloc reqs per second'     FORMAT = BEST12.
;
ATTRIB MEMREQ   LABEL = 'Number of pg refnce faults per second'     FORMAT = BEST12.   ;
ATTRIB MEMSTEAL LABEL = 'Number of pg prtctn flts on writable pgs'     FORMAT = BEST12.   ;
ATTRIB MEMSWPBF LABEL = 'Number of sawp buffer calls per second'     FORMAT = BEST12.
;
ATTRIB MEMSYNC LABEL = 'Number of TLB flushes/s all processors'     FORMAT = BEST12.   ;
ATTRIB MEMTFALT LABEL = 'Number of user page table faults'     FORMAT = BEST12.     ;
ATTRIB MEMUNUSD LABEL = 'Number of bytes of heap memory available'     FORMAT = BEST12.
;
ATTRIB MEMVMPRG LABEL = 'Number of individual TLB entrs purged/s'     FORMAT = BEST12.
;
ATTRIB MEMWCACH LABEL = 'Percent of 1 blks written to buff cache'     FORMAT = 5.2     ;
ATTRIB MEMWIRE   LABEL = 'Number of 1-KB mem pgs non-swappable'     FORMAT = BEST12.
;
ATTRIB MEMZERO LABEL = 'Number of mem pgs zero-filled on demand'     FORMAT = BEST12.
;

RUN ;

PROC SUMMARY DATA = MEM ;
BY NODE APP INSTANCE DATETIME DATE TIME HOUR;
ID QUARTER ;
VAR MEMACVPG MEMADTRF MEMALOCD MEMBFREE MEMBREAD MEMBREQ
    MEMBWRIT MEMBPREQ MEMCACHE MEMCOW MEMCOPYW MEMDFILL
    MEMFLUSH MEMFREEM MEMHPMEM MEMIDGET MEMIDPRG MEMIDWRP
    MEMLREAD MEMLWRT MEMOVRHD MEMPFALT MEMPREAD MEMPWRT
    MEMPGANT MEMPGFRD MEMPGIN MEMPGOUT MEMPSCND MEMPGFIL
    MEMPGSWP MEMRCACH MEMRFALT MEMREGIN MEMRGOUT MEMREQ
    MEMSTEAL MEMSWPBF MEMSYNC MEMTFALT MEMUNUSD MEMVMPRG
    MEMWCACH MEMWIRE MEMZERO ;
OUTPUT OUT= MEM
MEAN=MEMACVPG MEMADTRF MEMALOCD MEMBFREE MEMBREAD MEMBREQ
    MEMBWRIT MEMBPREQ MEMCACHE MEMCOW MEMCOPYW MEMDFILL
    MEMFLUSH MEMFREEM MEMHPMEM MEMIDGET MEMIDPRG MEMIDWRP
    MEMLREAD MEMLWRT MEMOVRHD MEMPFALT MEMPREAD MEMPWRT
    MEMPGANT MEMPGFRD MEMPGIN MEMPGOUT MEMPSCND MEMPGFIL
    MEMPGSWP MEMRCACH MEMRFALT MEMREGIN MEMRGOUT MEMREQ
    MEMSTEAL MEMSWPBF MEMSYNC MEMTFALT MEMUNUSD MEMVMPRG
    MEMWCACH MEMWIRE MEMZERO ;

* BUILD THE NETWORK PERFORMANCE DATA TABLE

**************************************************************************;

DATA NET ;
SET NET1 ;
  KEEP
     APP DATE DATETIME HOUR INSTANCE NODE PARM QUARTER TIME
     NETCOLPC NETIERRP NETOERRP NETPKTSI NETPKTSO ;

IF PARM= 'NETCollisionPrc'    THEN NETCOLPC = METRIC ;
ELSE IF PARM= 'NETInErrPrc'        THEN NETIERRP = METRIC ;
ELSE IF PARM= 'NETOutErrPrc'       THEN NETOERRP = METRIC ;
ELSE IF PARM= 'NETPacketsIn'       THEN NETPKTSI = METRIC ;
ELSE IF PARM= 'NETPacketsOut'      THEN NETPKTSO = METRIC ;

ATTRIB DATETIME LABEL = 'Date Time Stamp'          FORMAT = DATETIME21.2 ;
ATTRIB DATE     LABEL = 'Date'                     FORMAT = DATE9.       ;
ATTRIB TIME     LABEL = 'Time'                     FORMAT = TIME10.2     ;
ATTRIB HOUR     LABEL = 'Hour'                     FORMAT = Z2.          ;
ATTRIB QUARTER  LABEL = 'Quarter'                  FORMAT = BEST12.      ;
ATTRIB INSTANCE LABEL = 'Instance'                 LENGTH = $35          ;
ATTRIB APP      LABEL = 'Application'              LENGTH = $15          ;
ATTRIB NODE     LABEL = 'Node'                     LENGTH = $8           ;
ATTRIB NETCOLPC LABEL = 'Percent of output attempts made by host'  FORMAT = 5.2   ;
ATTRIB NETIERRP LABEL = 'Percent of incoming packets with errors'  FORMAT = 5.2   ;
ATTRIB NETOERRP LABEL = 'Percent of outgoing packets with errors'  FORMAT = 5.2   ;
ATTRIB NETPKTSI LABEL = 'Total incoming packets in interval'   FORMAT = BEST 12.  ; /*
STORED AS A COUNT */
ATTRIB NETPKTSO LABEL = 'Total outgoing packets in interval'   FORMAT = BEST12.   ; /*
STORED AS A COUNT */

RUN ;

PROC SUMMARY DATA = NET ;
BY NODE APP INSTANCE DATETIME DATE TIME HOUR;
ID QUARTER ;
VAR NETCOLPC NETIERRP NETOERRP NETPKTSI NETPKTSO ;
OUTPUT OUT= NET
MEAN=NETCOLPC NETIERRP NETOERRP NETPKTSI NETPKTSO ;

**************************************************************************;

* BUILD THE NETWORK FILE SYSTEM PERFORMANCE DATA TABLE

**************************************************************************;

DATA NFS ;
SET NFS1 ;
  KEEP

FIG. 8K

APP DATE DATETIME HOUR INSTANCE NODE PARM QUARTER TIME
NFSCBADC NFSCCALL NFSCCRTE NFSCFSST NFSCGATR NFSCLINK
NFSCLKUP NFSCMKDR NFSCNCLG NFSCNCLS NFSCNULL NFSCREAD
NFSCRDDR NFSCRDLK NFSCRMVE NFSCRNME NFSCRMDR NFSCRBCL
NFSCRBXI NFSCRCAL NFSCRNCD NFSCRNLR NFSCRRTN NFSCRTOT
NFSCRWAT NFSCSATR NFSCSLNK NFSCWRTE NFSSBADC NFSSCALL
NFSSCRTE NFSSFSST NFSSGATR NFSSLINK NFSSLKUP NFSSMKDR
NFSSNULL NFSSREAD NFSSRDDR NFSSRDLK NFSSRMVE NFSSRNME
NFSSRMDR NFSSRBCL NFSSRBLN NFSSRCAL NFSSNRCV NFSSRXCL
NFSSSATR NFSSSLNK NFSSWRTE ;

```
     IF PARM= 'NFSCBadCall'        THEN NFSCBADC = METRIC ;
ELSE IF PARM= 'NFSCCall'           THEN NFSCCALL = METRIC ;
ELSE IF PARM= 'NFSCCreate'         THEN NFSCCRTE = METRIC ;
ELSE IF PARM= 'NFSCFsStat'         THEN NFSCFSST = METRIC ;
ELSE IF PARM= 'NFSCGetAttr'        THEN NFSCGATR = METRIC ;
ELSE IF PARM= 'NFSCLink'           THEN NFSCLINK = METRIC ;
ELSE IF PARM= 'NFSCLookUp'         THEN NFSCLKUP = METRIC ;
ELSE IF PARM= 'NFSCMkDir'          THEN NFSCMKDR = METRIC ;
ELSE IF PARM= 'NFSCNclGet'         THEN NFSCNCLG = METRIC ;
ELSE IF PARM= 'NFSCNclSleep'       THEN NFSCNCLS = METRIC ;
ELSE IF PARM= 'NFSCNull'           THEN NFSCNULL = METRIC ;
ELSE IF PARM= 'NFSCRead'           THEN NFSCREAD = METRIC ;
ELSE IF PARM= 'NFSCReadDir'        THEN NFSCRDDR = METRIC ;
ELSE IF PARM= 'NFSCReadLink'       THEN NFSCRDLK = METRIC ;
ELSE IF PARM= 'NFSCRemove'         THEN NFSCRMVE = METRIC ;
ELSE IF PARM= 'NFSCRename'         THEN NFSCRNME = METRIC ;
ELSE IF PARM= 'NFSCRmDir'          THEN NFSCRMDR = METRIC ;
ELSE IF PARM= 'NFSCRpcBadCall'     THEN NFSCRBCL = METRIC ;
ELSE IF PARM= 'NFSCRpcBadXid'      THEN NFSCRBXI = METRIC ;
ELSE IF PARM= 'NFSCRpcCall'        THEN NFSCRCAL = METRIC ;
ELSE IF PARM= 'NFSCRpcNewCred'     THEN NFSCRNCD = METRIC ;
ELSE IF PARM= 'NFSCRpcNullRecv'    THEN NFSCRNLR = METRIC ;
ELSE IF PARM= 'NFSCRpcRetrans'     THEN NFSCRRTN = METRIC ;
ELSE IF PARM= 'NFSCRpcTimeOut'     THEN NFSCRTOT = METRIC ;
ELSE IF PARM= 'NFSCRpcWait'        THEN NFSCRWAT = METRIC ;
ELSE IF PARM= 'NFSCSetAttr'        THEN NFSCSATR = METRIC ;
ELSE IF PARM= 'NFSCSymLink'        THEN NFSCSLNK = METRIC ;
ELSE IF PARM= 'NFSCWrite'          THEN NFSCWRTE = METRIC ;
ELSE IF PARM= 'NFSSBadCall'        THEN NFSSBADC = METRIC ;
ELSE IF PARM= 'NFSSCall'           THEN NFSSCALL = METRIC ;
ELSE IF PARM= 'NFSSCreate'         THEN NFSSCRTE = METRIC ;
ELSE IF PARM= 'NFSSFsStat'         THEN NFSSFSST = METRIC ;
ELSE IF PARM= 'NFSSGetAttr'        THEN NFSSGATR = METRIC ;
ELSE IF PARM= 'NFSSLink'           THEN NFSSLINK = METRIC ;
ELSE IF PARM= 'NFSSLookUp'         THEN NFSSLKUP = METRIC ;
ELSE IF PARM= 'NFSSMkDir'          THEN NFSSMKDR = METRIC ;
ELSE IF PARM= 'NFSSNull'           THEN NFSSNULL = METRIC ;
ELSE IF PARM= 'NFSSRead'           THEN NFSSREAD = METRIC ;
ELSE IF PARM= 'NULLReadDir'        THEN NFSSRDDR = METRIC ;
ELSE IF PARM= 'NFSSReadLink'       THEN NFSSRDLK = METRIC ;
ELSE IF PARM= 'NFSSRemove'         THEN NFSSRMVE = METRIC ;
ELSE IF PARM= 'NFSSRename'         THEN NFSSRNME = METRIC ;
ELSE IF PARM= 'NFSSRmDir'          THEN NFSSRMDR = METRIC ;
```

FIG. 8L

```
ELSE IF PARM= 'NFSSRpcBadCall'      THEN NFSSRBCL = METRIC ;
ELSE IF PARM= 'NFSSRpcCall'         THEN NFSSRCAL = METRIC ;
ELSE IF PARM= 'NFSSRpcNullRecv'     THEN NFSSNRCV = METRIC ;
ELSE IF PARM= 'NFSSRpcXdrCall'      THEN NFSSRXCL = METRIC ;
ELSE IF PARM= 'NFSSSetAttr'         THEN NFSSSATR = METRIC ;
ELSE IF PARM= 'NFSSSymLink'         THEN NFSSSLNK = METRIC ;
ELSE IF PARM= 'NFSSWrite'           THEN NFSSWRTE = METRIC ;

ATTRIB DATETIME LABEL = 'Date Time Stamp'                       FORMAT = DATETIME21.2 ;
ATTRIB DATE     LABEL = 'Date'                         FORMAT = DATE9.       ;
ATTRIB TIME     LABEL = 'Time'                         FORMAT = TIME10.2     ;
ATTRIB HOUR     LABEL = 'Hour'                          FORMAT = Z2.         ;
ATTRIB QUARTER  LABEL = 'Quarter'                          FORMAT = BEST12.      ;
ATTRIB INSTANCE LABEL = 'Instance'                         LENGTH = $35         ;
ATTRIB APP      LABEL = 'Application'                      LENGTH = $15         ;
ATTRIB NODE     LABEL = 'Node'                             LENGTH = $8          ;
ATTRIB NFSCBADC LABEL = 'Percent of NFS client calls that failed'       FORMAT = 5.2         ;
ATTRIB NFSCCALL LABEL = 'Number of NFS client calls made'            FORMAT = BEST 12.    ;
ATTRIB NFSCCRTE LABEL = 'Percent of NFS clnt calls new file crte'       FORMAT = 5.2         ;
ATTRIB NFSCFSST LABEL = 'Percent of NFS clnt calls retrieve file'       FORMAT = 5.2         ;
ATTRIB NFSCGATR LABEL = 'Percent of NFS clnt calls request attr'        FORMAT = 5.2         ;
ATTRIB NFSCLINK LABEL = 'Percent of NFS clnt calls crte hard link'      FORMAT = 5.2         ;
ATTRIB NFSCLKUP LABEL = 'Percent of NFS clnt calls dir path lkup'       FORMAT = 5.2         ;
ATTRIB NFSCMKDR LABEL = 'Percent of NFS clnt calls create dir'          FORMAT = 5.2         ;
ATTRIB NFSCNCLG LABEL = 'Number of client request a new handle'        FORMAT = BEST12.    ;
ATTRIB NFSCNCLS LABEL = 'Number of kernel waits to get clnt strct'     FORMAT = BEST12.    ;
ATTRIB NFSCNULL LABEL = 'Percent of NFS NULL client calls'              FORMAT = 5.2         ;
ATTRIB NFSCREAD LABEL = 'Percent of NFS clnt calls read files'          FORMAT = 5.2         ;
ATTRIB NFSCRDDR LABEL = 'Percent of NFS client calls read dir'          FORMAT = 5.2         ;
ATTRIB NFSCRDLK LABEL = 'Percent of NFS clnt calls read symb link'      FORMAT = 5.2         ;
ATTRIB NFSCRMVE LABEL = 'Percent of NFS clnt calls to rm files'         FORMAT = 5.2         ;
ATTRIB NFSCRNME LABEL = 'Percent of NFS clnt calls to ren files'        FORMAT = 5.2         ;
ATTRIB NFSCRMDR LABEL = 'Percent of NFS clnt calls to rm dirs'          FORMAT = 5.2         ;
ATTRIB NFSCRBCL LABEL = 'Number of NFS clnt RPC calls in error'        FORMAT = BEST12.    ;
ATTRIB NFSCRBXI LABEL = 'Percent of clnt RPC calls mult resp'           FORMAT = 5.2         ;
ATTRIB NFSCRCAL LABEL = 'Number of NFS clnt RPC calls made server'         FORMAT = BEST12.
;
ATTRIB NFSCRNCD LABEL = 'Percent of clnt RPC calls to ref authent'          FORMAT = 5.2         ;
ATTRIB NFSCRNLR LABEL = 'Number of empty messages from TCP or LAN'          FORMAT =
BEST12.   ;
ATTRIB NFSCRRTN LABEL = 'Number of NFS clnt RPC retranmissions'             FORMAT = BEST12.
;
ATTRIB NFSCRTOT LABEL = 'Percent of clnt RPC calls that timed out'          FORMAT = 5.2         ;
ATTRIB NFSCRWAT LABEL = 'Number of times clnt rqst wait for handl'          FORMAT = BEST12.    ;
ATTRIB NFSCSATR LABEL = 'Percent of NFS clnt calls to store file'       FORMAT = 5.2         ;
ATTRIB NFSCSLNK LABEL = 'Percent of NFS clnt clls to crte sym lnk'      FORMAT = 5.2         ;
ATTRIB NFSCWRTE LABEL = 'Percent of NFS clnt calls to write files'      FORMAT = 5.2         ;
ATTRIB NFSSBADC LABEL = 'Percent of NFS srvr calls that failed'         FORMAT = 5.2         ;
ATTRIB NFSSCALL LABEL = 'Number of NFS srvr calls made'                 FORMAT = BEST12.     ;
ATTRIB NFSSCRTE LABEL = 'Percent of NFS srvr calls to create file'      FORMAT = 5.2         ;
ATTRIB NFSSFSST LABEL = 'Percent of NFS srvr calls to get fs'        FORMAT = 5.2         ;
ATTRIB NFSSGATR LABEL = 'Percent of NFS srvr calls to get attr'       FORMAT = 5.2         ;
ATTRIB NFSSLINK LABEL = 'Percent of NFS srvr calls create hrd lnk'     FORMAT = 5.2         ;
ATTRIB NFSSLKUP LABEL = 'Percent of NFS srvr calls dir path lkup'      FORMAT = 5.2         ;
```

FIG. 8M

ATTRIB NFSSMKDR  LABEL = 'Percent of NFS srvr calls create dirs'    FORMAT = 5.2   ;
ATTRIB NFSSNULL  LABEL = 'Percent of NULL NFS srvr calls'           FORMAT = 5.2   ;
ATTRIB NFSSREAD  LABEL = 'Percent of NFS srvr calls read data file' FORMAT = 5.2   ;
ATTRIB NFSSRDDR  LABEL = 'Percent of NFS srvr calls read dirs'      FORMAT = 5.2   ;
ATTRIB NFSSRDLK  LABEL = 'Percent of NFS srvr calls read sym links' FORMAT = 5.2   ;
ATTRIB NFSSRMVE  LABEL = 'Percent of NFS srvr calls rm files'       FORMAT = 5.2   ;
ATTRIB NFSSRNME  LABEL = 'Percent of NFS srvr calls ren files'      FORMAT = 5.2   ;
ATTRIB NFSSRMDR  LABEL = 'Percent of NFS srvr calls rm dirs'        FORMAT = 5.2   ;
ATTRIB NFSSRBCL  LABEL = 'Percent of NFS RPC srvr rqsts rejected'   FORMAT = 5.2   ;
ATTRIB NFSSRBLN  LABEL = 'Number of srvr RPC calls truncated'       FORMAT = BEST12. ;
ATTRIB NFSSRCAL  LABEL = 'Number of NFS srvr RPC calls'             FORMAT = BEST12. ;
ATTRIB NFSSNRCV  LABEL = 'Number of NULL RPC calls srvr received'   FORMAT = BEST12.
;
ATTRIB NFSSRXCL  LABEL = 'Number of NFS srvr RPC calls bad headers' FORMAT = BEST12.
;
ATTRIB NFSSSATR  LABEL = 'Percent of NFS srvr calls to store file'  FORMAT = 5.2   ;
ATTRIB NFSSSLNK  LABEL = 'Percent of NFS srvr calls create sym lnk' FORMAT = 5.2   ;
ATTRIB NFSSWRTE  LABEL = 'Percent of NFS srvr calls to write files' FORMAT = 5.2   ;

RUN ;

PROC SUMMARY DATA = NFS ;
BY NODE APP INSTANCE DATETIME DATE TIME HOUR;
ID QUARTER ;
VAR NFSCBADC NFSCCALL NFSCCRTE NFSCFSST NFSCGATR NFSCLINK
   NFSCLKUP NFSCMKDR NFSCNCLG NFSCNCLS NFSCNULL NFSCREAD
   NFSCRDDR NFSCRDLK NFSCRMVE NFSCRNME NFSCRMDR NFSCRBCL
   NFSCRBXI NFSCRCAL NFSCRNCD NFSCRNLR NFSCRRTN NFSCRTOT
   NFSCRWAT NFSCSATR NFSCSLNK NFSCWRTE NFSSBADC NFSSCALL
   NFSSCRTE NFSSFSST NFSSGATR NFSSLINK NFSSLKUP NFSSMKDR
   NFSSNULL NFSSREAD NFSSRDDR NFSSRDLK NFSSRMVE NFSSRNME
   NFSSRMDR NFSSRBCL NFSSRBLN NFSSRCAL NFSSNRCV NFSSRXCL
   NFSSSATR NFSSSLNK NFSSWRTE ;
OUTPUT OUT= NFS
MEAN=NFSCBADC NFSCCALL NFSCCRTE NFSCFSST NFSCGATR NFSCLINK
   NFSCLKUP NFSCMKDR NFSCNCLG NFSCNCLS NFSCNULL NFSCREAD
   NFSCRDDR NFSCRDLK NFSCRMVE NFSCRNME NFSCRMDR NFSCRBCL
   NFSCRBXI NFSCRCAL NFSCRNCD NFSCRNLR NFSCRRTN NFSCRTOT
   NFSCRWAT NFSCSATR NFSCSLNK NFSCWRTE NFSSBADC NFSSCALL
   NFSSCRTE NFSSFSST NFSSGATR NFSSLINK NFSSLKUP NFSSMKDR
   NFSSNULL NFSSREAD NFSSRDDR NFSSRDLK NFSSRMVE NFSSRNME
   NFSSRMDR NFSSRBCL NFSSRBLN NFSSRCAL NFSSNRCV NFSSRXCL
   NFSSSATR NFSSSLNK NFSSWRTE ;

RUN ;
*******************************************************************************;

* BUILD THE Oracle7 PERFORMANCE DATA TABLE

*******************************************************************************;
DATA ORA ;
SET ORA1 ;
   KEEP
       APP DATE DATETIME HOUR INSTANCE NODE PARM QUARTER TIME

FIG. 8N

ORAACTTR ORAALERT ORAARCFS ORABFBSY ORABKCKR ORACHDRW
ORACHHTR ORADCHHR ORADSKST ORADSPBY ORADSPWT ORAENQTO
ORAFRESD ORAFRESP ORAMAXEX ORAOCURU ORAPROCU ORARDGNR
ORARDNAR ORASESUS ORAVERVR ORLIBCHR ORRDSZAV ORRLBTSU
ORSDIPRG ORSTSUSD ORTRANRT ;

```
    IF PARM= 'ActiveTransactions'       THEN ORAACTTR = METRIC ;
ELSE IF PARM= 'Alerts'                  THEN ORAALERT = METRIC ;
ELSE IF PARM= 'ArchiveFreeSpace'          THEN ORAARCFS = METRIC ;
ELSE IF PARM= 'BkgdCheckpointRate'           THEN ORABKCKR = METRIC ;
ELSE IF PARM= 'BufferBusyRate'            THEN ORABFBSY = METRIC ;
ELSE IF PARM= 'CacheHitRatio'             THEN ORACHHTR = METRIC ;
ELSE IF PARM = 'ChainedRows'              THEN ORACHDRW = METRIC ;
ELSE IF PARM= 'DictCacheHitRatio'          THEN ORADCHHR = METRIC ;
ELSE IF PARM= 'DiskSorts'               THEN ORADSKST = METRIC ;
ELSE IF PARM= 'DispatcherBusyRates'          THEN ORADSPBY = METRIC ;
ELSE IF PARM= 'DispatcherWaitTimes'          THEN ORADSPWT = METRIC ;
ELSE IF PARM= 'EnqueueTimeouts'            THEN ORAENQTO = METRIC ;
ELSE IF PARM= 'FreeSpace'               THEN ORAFRESP = METRIC ;
ELSE IF PARM= 'FreeSpaceDeficit'            THEN ORAFRESD = METRIC ;
ELSE IF PARM= 'LibraryCacheHitRatio'           THEN ORLIBCHR = METRIC ;
ELSE IF PARM= 'MaximumExtents'             THEN ORAMAXEX = METRIC ;
ELSE IF PARM= 'OpenCursorsUsed'            THEN ORAOCURU = METRIC ;
ELSE IF PARM= 'ProcessesUsed'             THEN ORAPROCU = METRIC ;
ELSE IF PARM = 'RedoGeneration Rate'         THEN ORARDGNR = METRIC ;
ELSE IF PARM= 'RedoNotArchived'            THEN ORARDNAR = METRIC ;
ELSE IF PARM= 'RedoSizeAverage'            THEN ORRDSZAV = METRIC ;
ELSE IF PARM= 'RollbackTSUsed'             THEN ORRLBTSU = METRIC ;
ELSE IF PARM= 'SessionsUsed'            THEN ORASESUS = METRIC ;
ELSE IF PARM= 'ShutdownInProgress'           THEN ORSDIPRG = METRIC ;
ELSE IF PARM= 'SystemTSUsed'              THEN ORSTSUSD = METRIC ;
ELSE IF PARM= 'TransactionRate'            THEN ORTRANRT = METRIC ;
ELSE IF PARM= 'VersionVerification'          THEN ORAVERVR = METRIC ;

ATTRIB DATETIME LABEL = 'Date Time Stamp'              FORMAT = DATETIME21.2 ;
    ATTRIB DATE   LABEL = 'Date'                 FORMAT = DATE9.      ;
    ATTRIB TIME   LABEL = 'Time'                 FORMAT = TIME10.2    ;
    ATTRIB HOUR  LABEL = 'Hour'                 FORMAT = Z2.         ;
    ATTRIB QUARTER LABEL = 'Quarter'                FORMAT = BEST12.    ;
    ATTRIB INSTANCE LABEL = 'Instance'               LENGTH = $35       ;
    ATTRIB APP    LABEL = 'Application'              LENGTH = $15       ;
    ATTRIB NODE   LABEL = 'Node'                 LENGTH = $8        ;
    ATTRIB ORAACTTR LABEL = 'Percent of active vs total transactions'    FORMAT = 5.2       ;
    ATTRIB ORAALERT LABEL = 'Oracle alert log errors'         FORMAT = BEST12.    ;
    ATTRIB ORAARCFS LABEL = 'Number of Archive logs space available'     FORMAT = BEST12.
;
    ATTRIB ORABKCKR LABEL = 'Number of checkpoints taken per hour'       FORMAT = BEST12.2
;
    ATTRIB ORABFBSY  LABEL = 'Ratio of waits to block gest per intervl'    FORMAT = BEST12.2  ;
    ATTRIB ORACHHTR LABEL = 'Ratio of cache hits to all data bfr rds'      FORMAT = BEST12.2  ;
    ATTRIB ORACHDRW LABEL = 'Number of chained row fetches per hour'     FORMAT = BEST12.2
;
    ATTRIB ORADCHHR LABEL = 'Percent of of Dict reads cache hits'        FORMAT = 5.2       ;
    ATTRIB ORADSKST LABEL = 'Percent of sorts that are disk sorts'       FORMAT = 5.2       ;
```

FIG. 8O

```
ATTRIB ORADSPBY LABEL = 'Percent of busiest dispatcher busy'       FORMAT = 5.2        ;
ATTRIB ORADSPWT LABEL = 'Average longest wait time Sec/100'        FORMAT = TIME12.2   ;
ATTRIB ORAENQTO LABEL = 'Number of locks not granted immediately'  FORMAT = BEST12.2
;
ATTRIB ORAFRESP LABEL = 'Percentage of space available'            FORMAT = 5.2        ;
ATTRIB ORAFRESD LABEL = 'Segment does not have another extent'     FORMAT = BEST12.    ;
ATTRIB ORLIBCHR LABEL = 'Percent of library cache hits'            FORMAT = 5.2        ;
ATTRIB ORAMAXEX LABEL = 'Percent of Extents available'             FORMAT = 5.2        ;
ATTRIB ORAOCURU LABEL = 'Percent of Open Cursors available'        FORMAT = 5.2        ;
ATTRIB ORAPROCU LABEL = 'Percent of Processes available'           FORMAT = 5.2        ;
ATTRIB ORARDGNR LABEL = 'Blocks per interval of redo data genrted' FORMAT = BEST12.2
;
ATTRIB ORARDNAR LABEL = 'Number of redo logs not yet archived'     FORMAT = BEST12.    ;
ATTRIB ORRDSZAV LABEL = 'Average size of last n redo log entries'  FORMAT = BEST12.2   ;
ATTRIB ORRLBTSU LABEL = 'Percent of space used in the rollback TS' FORMAT = 5.2        ;
ATTRIB ORASESUS LABEL = 'Percent of total sessions active'         FORMAT = 5.2        ;
ATTRIB ORSDIPRG LABEL = 'Shutdowns in progress'                    FORMAT = BEST12.    ;
ATTRIB ORSTSUSD LABEL = 'Percent of System TS used'                FORMAT = 5.2        ;
ATTRIB ORTRANRT LABEL = 'Number of transactions per interval'      FORMAT = BEST12.    ;
ATTRIB ORAVERVR LABEL = 'Verification of db objects loaded'        FORMAT = BEST12.    ;

RUN ;

PROC SUMMARY DATA = ORA ;
BY NODE APP INSTANCE DATETIME DATE TIME HOUR;
ID QUARTER ;
VAR ORAACTTR ORAALERT ORAARCFS ORABFBSY ORABKCKR ORACHDRW
    ORACHHTR ORADCHHR ORADSKST ORADSPBY ORADSPWT ORAENQTO
    ORAFRESD ORAFRESP ORAMAXEX ORAOCURU ORAPROCU ORARDGNR
    ORARDNAR ORASESUS ORAVERVR ORLIBCHR ORRDSZAV ORRLBTSU
    ORSDIPRG ORSTSUSD ORTRANRT ;
OUTPUT OUT= ORA
MEAN=ORAACTTR ORAALERT ORAARCFS ORABFBSY ORABKCKR ORACHDRW
    ORACHHTR ORADCHHR ORADSKST ORADSPBY ORADSPWT ORAENQTO
    ORAFRESD ORAFRESP ORAMAXEX ORAOCURU ORAPROCU ORARDGNR
    ORARDNAR ORASESUS ORAVERVR ORLIBCHR ORRDSZAV ORRLBTSU
    ORSDIPRG ORSTSUSD ORTRANRT ;

RUN ;

*******************************************************************;

* BUILD THE PATROL AGENT PERFORMANCE DATA TABLE

*******************************************************************;

DATA PA ;
SET PA1 ;
    KEEP
        APP DATE DATETIME HOUR INSTANCE NODE PARM QUARTER TIME
        PADBEXSC PAINTERR PAOUTSJB PATOTERR PAUSRERR PAWKRATE ;

IF PARM= 'PADeltaBetweenExecSecs'   THEN PADBEXSC = METRIC ;
ELSE IF PARM= 'PAInternalError'         THEN PAINTERR = METRIC ;
```

FIG. 8P

```
ELSE IF PARM= 'PAOutstandingJobs'        THEN PAOUTSJB = METRIC ;
ELSE IF PARM= 'PATotalErrors'            THEN PATOTERR = METRIC ;
ELSE IF PARM= 'PAUserErrors'             THEN PAUSRERR = METRIC ;
ELSE IF PARM= 'PAWorkRateExecsMin'       THEN PAWKRATE = METRIC ;

ATTRIB DATETIME LABEL = 'Date Time Stamp'              FORMAT = DATETIME21.2 ;
ATTRIB DATE     LABEL = 'Date'                         FORMAT = DATE9.        ;
ATTRIB TIME     LABEL = 'Time'                         FORMAT = TIME10.2      ;
ATTRIB HOUR     LABEL = 'Hour'                         FORMAT = Z2.           ;
ATTRIB QUARTER  LABEL = 'Quarter'                      FORMAT = BEST 12.      ;
ATTRIB INSTANCE LABEL = 'Instance'                     LENGTH = $35           ;
ATTRIB APP      LABEL = 'Application'                  LENGTH = $15           ;
ATTRIB NODE     LABEL = 'Node'                         LENGTH = $8            ;
ATTRIB PADBEXSC LABEL = 'Number of seconds between executions'   FORMAT = BEST 12.
;
ATTRIB PAINTERR LABEL = 'Number of miscellaneous internal errors'   FORMAT = BEST12.  ;
ATTRIB PAOUTSJB LABEL = 'Number of executing jobs on the PA'        FORMAT = BEST12.  ;
ATTRIB PATOTERR LABEL = 'Number of errors detected by the PA'       FORMAT= BEST12.   ;
ATTRIB PAUSRERR LABEL = 'Number or errors in user-specified cmds'   FORMAT = BEST12.  ;
ATTRIB PAWKRATE LABEL = 'Number of instruction execs performed/m'   FORMAT = BEST12.
;

RUN ;

PROC SUMMARY DATA = PA ;
BY NODE APP INSTANCE DATETIME DATE TIME HOUR;
ID QUARTER ;
VAR PADBEXSC PAINTERR PAOUTSJB PATOTERR PAUSRERR PAWKRATE ;
OUTPUT OUT= PA
MEAN=PADBEXSC PAINTERR PAOUTSJB PATOTERR PAUSRERR PAWKRATE ;

*******************************************************************************;

* BUILD THE PROCESS PERFORMANCE DATA TABLE

*******************************************************************************;

DATA PROC ;
SET PROC1 ;
 KEEP
    APP DATE DATETIME HOUR INSTANCE NODE PARM QUARTER TIME
    PRCAUSRP PRCEXEC PRCNOZOM PRCNUMPR PRCWAIT PRCPWTIN
    PRCPWTUN PRCTOPPS PRCUSERP PRCNUMP ;

LENGTH PRCTOPPS $120 ;

IF PARM= 'PROCAvgUsrProc'    THEN PRCAUSRP = METRIC ;
ELSE IF PARM= 'PROCExec'         THEN PRCEXEC = METRIC ;
ELSE IF PARM= 'PROCNoZombies'    THEN PRCNOZOM = METRIC ;
ELSE IF PARM= 'PROCNumProcs'     THEN PRCNUMPR = METRIC ;
ELSE IF PARM= 'PROCProcWait'     THEN PRCWAIT = METRIC ;
ELSE IF PARM= 'PROCProcWaitInt'  THEN PRCPWTIN = METRIC ;
ELSE IF PARM= 'PROCProcWaitUnint' THEN PRCPWTUN = METRIC ;
```

FIG. 8Q

```
ELSE IF PARM= 'PROCTopProcs'      THEN PRCTOPPS = METRIC ;
ELSE IF PARM= 'PROCUserProcs'     THEN PRCUSERP = METRIC ;
ELSE IF PARM= 'ProcNumProcs'      THEN PRCNUMP = METRIC ;

ATTRIB DATETIME LABEL = 'Date Time Stamp'          FORMAT = DATETIME21.2 ;
ATTRIB DATE    LABEL = 'Date'                      FORMAT = DATE9.       ;
ATTRIB TIME    LABEL = 'Time'                      FORMAT = TIME10.2     ;
ATTRIB HOUR    LABEL = 'Hour'                      FORMAT = Z2.          ;
ATTRIB QUARTER LABEL = 'Quarter'                   FORMAT = BEST12.      ;
ATTRIB INSTANCE LABEL = 'Instance'                 LENGTH = $35          ;
ATTRIB APP     LABEL = 'Application'               LENGTH = $15          ;
ATTRIB NODE    LABEL = 'Node'                      LENGTH = $8           ;
ATTRIB PRCAUSRP LABEL = 'Average Number Non-root user processes'    FORMAT = BEST12.
;
ATTRIB PRCEXEC  LABEL = 'Number of exec system calls per second'    FORMAT = BEST12.   ;
ATTRIB PRCNOZOM LABEL = 'Number of zombie processes'                FORMAT = BEST12.   ;
ATTRIB PRCNUMPR LABEL = 'Number of active processes on the system' FORMAT = BEST12.
;
ATTRIB PRCWAIT   LABEL = 'Number of processes waiting for resourcs' FORMAT = BEST12.   ;
ATTRIB PRCPWTIN LABEL = 'Number of procs in interruptable wait'     FORMAT = BEST12.   ;
ATTRIB PRCPWTUN LABEL = 'Number of procs in uninterruptable wait'   FORMAT = BEST12.   ;
ATTRIB PRCTOPPS LABEL = 'Top CPU using processes (max 10)'          LENGTH = $120      ;
ATTRIB PRCUSERP LABEL = 'Number of nonroot user processes'          FORMAT = BEST12.   ;
ATTRIB PRCNUMP LABEL = 'Number of processes per nonroot user'       FORMAT = BEST12.2  ;

RUN ;

PROC SUMMARY DATA = PROC ;
BY NODE APP INSTANCE DATETIME DATE TIME HOUR;
ID QUARTER PRCTOPPS ;
VAR PRCAUSRP PRCEXEC PRCNOZOM PRCNUMPR PRCWAIT PRCPWTIN
    PRCPWTUN PRCUSERP PRCNUMP ;
OUTPUT OUT= PROC
MEAN=PRCAUSRP PRCEXEC PRCNOZOM PRCNUMPR PRCWAIT PRCPWTIN
    PRCPWTUN PRCUSERP PRCNUMP ;

RUN ;

************************************************************************;

* BUILD THE Sybase10DB PERFORMANCE DATA TABLE

************************************************************************;
DATA SDB ;
SET SDB1 ;
 KEEP
    APP DATE DATETIME HOUR INSTANCE NODE PARM QUARTER TIME
    SDBEXSPC SDBSGSPC SDBSUSIX SDBTRLOG ;

IF PARM= 'S10DBExpansionSpace'    THEN SDBEXSPC = METRIC ;
ELSE IF PARM= 'S10DBSegSpace'        THEN SDBSGSPC = METRIC ;
ELSE IF PARM= 'S10DBSuspectIndex'    THEN SDBSUSIX = METRIC ;
ELSE IF PARM= 'S10DBTransactionLogS' THEN SDBTRLOG = METRIC ;
```

FIG. 8R

```
ATTRIB DATETIME LABEL = 'Date Time Stamp'              FORMAT = DATETIME21.2 ;
ATTRIB DATE     LABEL = 'Date'                         FORMAT = DATE9.    ;
ATTRIB TIME     LABEL = 'Time'                         FORMAT = TIME10.2  ;
ATTRIB HOUR     LABEL = 'Hour'                         FORMAT = Z2.       ;
ATTRIB QUARTER  LABEL = 'Quarter'                      FORMAT = BEST12.   ;
ATTRIB INSTANCE LABEL = 'Instance'                     LENGTH = $35       ;
ATTRIB APP      LABEL = 'Application'                  LENGTH = $15       ;
ATTRIB NODE     LABEL = 'Node'                         LENGTH = $8        ;
ATTRIB SDBEXSPC LABEL = 'Percent Expansion Space Available'    FORMAT = 5.2      ;
ATTRIB SDBSGSPC LABEL = 'Segment Space'                FORMAT = BEST12.   ;
ATTRIB SDBSUSIX LABEL = 'Suspect Index'                FORMAT = BEST12.   ;
ATTRIB SDBTRLOG LABEL = 'Percent Transaction Log Space Available'    FORMAT = 5.2      ;

RUN ;

PROC SUMMARY DATA = SDB ;
BY NODE APP INSTANCE DATETIME DATE TIME HOUR;
ID QUARTER ;
VAR SDBEXSPC SDBSGSPC SDBSUSIX SDBTRLOG ;
OUTPUT OUT= SDB
MEAN=SDBEXSPC SDBSGSPC SDBSUSIX SDBTRLOG ;

RUN ;

*******************************************************************************;

* BUILD THE SMP PERFORMANCE DATA TABLE

*******************************************************************************;

DATA SMP ;
SET SMP1 ;
  KEEP
      APP DATE DATETIME HOUR INSTANCE NODE PARM QUARTER TIME
      SMPCTXSW SMPCXCLS SMPIDLPC SMPINTTR SMPINTER SMPINVCX
      SMPMAJFT SMPMINFT SMPRQ15M SMPRQ1MN SMPRQ5MN SMPSPNMX
      SMPSPNRW SMPSYSCL SMPSYSPC SMPTHMIG SMPUSRPC SMPWTPCT ;

IF PARM= 'SMPContextSwitch'         THEN SMPCTXSW = METRIC ;
ELSE IF PARM= 'SMPCrossCalls'          THEN SMPCXCLS = METRIC ;
ELSE IF PARM= 'SMPIdlePercent'         THEN SMPIDLPC = METRIC ;
ELSE IF PARM= 'SMPIntThread'           THEN SMPINTTR = METRIC ;
ELSE IF PARM= 'SMPInterrupts'          THEN SMPINTER = METRIC ;
ELSE IF PARM= 'SMPInvContSwitch'       THEN SMPINVCX = METRIC ;
ELSE IF PARM= 'SMPMajorFaults'         THEN SMPMAJFT = METRIC ;
ELSE IF PARM= 'SMPMinorFaults'         THEN SMPMINFT = METRIC ;
ELSE IF PARM= 'SMPRunQLen15Min'        THEN SMPRQ15M = METRIC ;
ELSE IF PARM= 'SMPRunQLen1Min'         THEN SMPRQ1MN = METRIC ;
ELSE IF PARM= 'SMPRunQLen5Min'         THEN SMPRQ5MN = METRIC ;
ELSE IF PARM= 'SMPSpinMutex'           THEN SMPSPNMX = METRIC ;
ELSE IF PARM= 'SMPSpinRdWr'            THEN SMPSPNRW = METRIC ;
ELSE IF PARM= 'SMPSystemCalls'         THEN SMPSYSCL = METRIC ;
ELSE IF PARM= 'SMPSystemPrcnt'         THEN SMPSYSPC = METRIC ;
ELSE IF PARM= 'SMPThMigration'         THEN SMPTHMIG = METRIC ;
ELSE IF PARM= 'SMPUserPercent'         THEN SMPUSRPC = METRIC ;
```

FIG. 8S

ELSE IF PARM= 'SMPWaitPercent'        THEN SMPWTPCT = METRIC ;

ATTRIB DATETIME LABEL = 'Date Time Stamp'              FORMAT = DATETIME21.2 ;
ATTRIB DATE   LABEL = 'Date'                           FORMAT = DATE9.        ;
ATTRIB TIME   LABEL = 'Time'                           FORMAT = TIME10.2      ;
ATTRIB HOUR   LABEL = 'Hour'                           FORMAT = Z2.           ;
ATTRIB QUARTER LABEL = 'Quarter'                       FORMAT = BEST12.       ;
ATTRIB INSTANCE LABEL = 'Instance'                     LENGTH = $35           ;
ATTRIB APP    LABEL = 'Application'                    LENGTH = $15           ;
ATTRIB NODE   LABEL = 'Node'                           LENGTH = $8            ;
ATTRIB SMPCTXSW LABEL = 'Number of CPU context switches'        FORMAT = BEST12.   ;
ATTRIB SMPCXCLS LABEL = 'Number of interprocessor cross-calls'  FORMAT = BEST12.   ;
ATTRIB SMPIDLPC LABEL = 'Percent of time the CPU was idle'      FORMAT = TIME11.2  ;
ATTRIB SMPINTTR LABEL = 'Number of processor interrupts'        FORMAT = BEST12.   ;
ATTRIB SMPINTER LABEL = 'Number of interrupts as threads'       FORMAT = BEST12.   ;
ATTRIB SMPINVCX LABEL = 'Number of involuntary context switches' FORMAT = BEST12.  ;
ATTRIB SMPMAJFT LABEL = 'Number of major faults'                FORMAT = BEST12.   ;
ATTRIB SMPMINFT LABEL = 'Number of minor faults'                FORMAT = BEST12.   ;
ATTRIB SMPRQ15M LABEL = 'Number of procs in the CPU run queue 1mn'  FORMAT = BEST12. ;
ATTRIB SMPRQ1MN LABEL = 'Number of procs in the CPU run queue 5mn'  FORMAT = BEST12. ;
ATTRIB SMPRQ5MN LABEL = 'Number of procs in the CPU run queue 15m'  FORMAT = BEST12. ;
ATTRIB SMPSPNMX LABEL = 'Number of spins locks not acqrd 1st try'   FORMAT = BEST12.   ;
ATTRIB SMPSPNRW LABEL = 'Number of r/w locks not acqrd on 1st try'  FORMAT = BEST12.   ;
ATTRIB SMPSYSCL LABEL = 'Number of system calls'                    FORMAT = BEST12.   ;
ATTRIB SMPSYSPC LABEL = 'Processor time spent on sys activities'    FORMAT = TIME11.2  ;
ATTRIB SMPTHMIG LABEL = 'Number of thread migs another processor'   FORMAT = BEST12.   ;
ATTRIB SMPUSRPC LABEL = 'Processor time spent waiting'              FORMAT = TIME11.2  ;
ATTRIB SMPWTPCT LABEL = 'Processor time spent on user activities'   FORMAT = TIME11.2  ;

RUN ;

PROC SUMMARY DATA = SMP ;
BY NODE APP INSTANCE DATETIME DATE TIME HOUR;
ID QUARTER ;
VAR SMPCTXSW SMPCXCLS SMPIDLPC SMPINTTR SMPINTER SMPINVCX
    SMPMAJFT SMPMINFT SMPRQ15M SMPRQ1MN SMPRQ5MN SMPSPNMX
    SMPSPNRW SMPSYSCL SMPSYSPC SMPTHMIG SMPUSRPC SMPWTPCT ;
OUTPUT OUT= SMP
MEAN=SMPCTXSW SMPCXCLS SMPIDLPC SMPINTTR SMPINTER SMPINVCX
    SMPMAJFT SMPMINFT SMPRQ15M SMPRQ1MN SMPRQ5MN SMPSPNMX
    SMPSPNRW SMPSYSCL SMPSYSPC SMPTHMIG SMPUSRPC SMPWTPCT ;

RUN ;

*****************************************************************************;

* BUILD THE SWAP PERFORMANCE DATA TABLE

```
DATA SWP ;
SET SWP1 ;
 KEEP
    APP DATE DATETIME HOUR INSTANCE NODE PARM QUARTER TIME
    SWPSFRSP SWPSIZE SWPUSDPC SWPTOTFR SWPTOTSZ SWPTOTUP
    SWPNPAVL ;

IF PARM= 'SWPSwapFreeSpace'     THEN SWPSFRSP = METRIC ;
 ELSE IF PARM= 'SWPSwapSize'        THEN SWPSIZE = METRIC ;
 ELSE IF PARM= 'SWPSwapUsedPercent'    THEN SWPUSDPC = METRIC ;
 ELSE IF PARM= 'SWPTotSwapFreeSpace'    THEN SWPTOTFR = METRIC ;
 ELSE IF PARM= 'SWPTotSwapSize'      THEN SWPTOTSZ = METRIC ;
 ELSE IF PARM= 'SWPTotSwapUsedPercent'   THEN SWPTOTUP = METRIC ;
 ELSE IF PARM= 'SWPnPageSizeAvail'    THEN SWPNPAVL = METRIC ;

ATTRIB DATETIME    LABEL = 'Date Time Stamp'            FORMAT = DATETIME21.2 ;
 ATTRIB DATE    LABEL = 'Date'         FORMAT = DATE9.       ;
 ATTRIB TIME   LABEL = 'Time'          FORMAT = TIME10.2     ;
 ATTRIB HOUR LABEL = 'Hour'            FORMAT = Z2.          ;
 ATTRIB QUARTER  LABEL = 'Quarter'            FORMAT = BEST12.       ;
 ATTRIB INSTANCE LABEL = 'Instance'           LENGTH = $35          ;
 ATTRIB APP   LABEL = 'Application'           LENGTH = $15       ;
 ATTRIB NODE   LABEL = 'Node'           LENGTH = $8         ;
 ATTRIB SWPNPAVL LABEL = 'Number of swap pages available'     FORMAT = BEST12.       ;
 /* STORED AS A COUNT */
 ATTRIB SWPTOTFR LABEL = 'Size of the free swap space'       FORMAT = BEST12.   ;   /*
 STORED AS A COUNT */
 ATTRIB SWPTOTSZ LABEL = 'Size of the entire swap space'     FORMAT = BEST12.   ;   /*
 STORED AS A COUNT */
 ATTRIB SWPSFRSP LABEL = 'Size of the available swap space'   FORMAT = BEST12.   ;   /*
 STORED AS A COUNT */
 ATTRIB SWPSIZE LABEL = 'Size of a particular swap area'    FORMAT = BEST12.   ;   /*
 STORED AS A COUNT */
 ATTRIB SWPUSDPC LABEL = 'Percentage of swap space used'    FORMAT = 5.2           ;

RUN ;

PROC SUMMARY DATA = SWP ;
BY NODE APP INSTANCE DATETIME DATE TIME HOUR;
ID QUARTER ;
VAR SWPSFRSP SWPSIZE SWPUSDPC SWPTOTFR SWPTOTSZ SWPTOTUP
   SWPNPAVL ;
OUTPUT OUT= SWP
MEAN=SWPSFRSP SWPSIZE SWPUSDPC SWPTOTFR SWPTOTSZ SWPTOTUP
   SWPNPAVL ;
RUN ;

*****************************************************************************;

* BUILD THE Sybase10 PERFORMANCE DATA TABLE

*****************************************************************************;
DATA SYB ;
SET SYB1 ;
```

FIG. 8U

```
KEEP
    APP DATE DATETIME HOUR INSTANCE NODE PARM QUARTER TIME
    S10BUSST S10BLPCS S10CONNR S10CPUBY S10CPUIL S10CPUIO
    S10DKIOE S10DKIOR S10DKIOW S10IDLPR S10LK4GC S10LKRMN
    S10MUPRC S10MRRDV S10NBLPR S10NPROC S10PKTER S10PKRCV
    S10PKSNT ;

IF PARM= 'S10BackupServerStatu'      THEN S10BUSST = METRIC ;
ELSE IF PARM= 'S10BlockerProcs'           THEN S10BLPCS = METRIC ;
ELSE IF PARM= 'S10ConnectionsRemain'      THEN S10CONNR = METRIC ;
ELSE IF PARM= 'S10CpuBusy'                THEN S10CPUBY = METRIC ;
ELSE IF PARM= 'S10CpuIdle'                THEN S10CPUIL = METRIC ;
ELSE IF PARM= 'S10CpuIoBusy'              THEN S10CPUIO = METRIC ;
ELSE IF PARM= 'S10DiskIoErrs'             THEN S10DKIOE = METRIC ;
ELSE IF PARM= 'S10DiskIoReads'            THEN S10DKIOR = METRIC ;
ELSE IF PARM= 'S 10DiskIoWrites'          THEN S10DKIOW = METRIC ;
ELSE IF PARM= 'S10IdleProcs'              THEN S10IDLPR = METRIC ;
ELSE IF PARM= 'S10Locks4GC'               THEN S10LK4GC = METRIC ;
ELSE IF PARM= 'S10LocksRemaining'         THEN S10LKRMN = METRIC ;
ELSE IF PARM= 'S10MemoryUsedByProcs'      THEN S10MUPRC = METRIC ;
ELSE IF PARM= 'S10MirrorDevices'          THEN S10MRRDV = METRIC ;
ELSE IF PARM= 'S10NumBlockedProcs'        THEN S10NBLPR = METRIC ;
ELSE IF PARM= 'S10NumProcesses'           THEN S10NPROC = METRIC ;
ELSE IF PARM= 'S10PacketErrs'             THEN S10PKTER = METRIC ;
ELSE IF PARM= 'S10PacketsRcvd'            THEN S10PKRCV = METRIC ;
ELSE IF PARM= 'S10PacketsSent'            THEN S10PKSNT = METRIC ;

ATTRIB DATETIME LABEL = 'Date Time Stamp'              FORMAT = DATETIME21.2 ;
ATTRIB DATE    LABEL = 'Date'                          FORMAT = DATE9.    ;
ATTRIB TIME    LABEL = 'Time'                          FORMAT = TIME10.2  ;
ATTRIB HOUR    LABEL = 'Hour'                          FORMAT = Z2.       ;
ATTRIB QUARTER  LABEL = 'Quarter'                      FORMAT = BEST12.   ;
ATTRIB INSTANCE LABEL = 'Instance'                     LENGTH = $35       ;
ATTRIB APP     LABEL = 'Application'                   LENGTH = $15       ;
ATTRIB NODE    LABEL = 'Node'                          LENGTH = $8        ;
ATTRIB S10BUSST LABEL = 'Backup Server Status'         FORMAT = BEST12.   ;
ATTRIB S10BLPCS LABEL = 'Number of Blocker Procs'      FORMAT = BEST12.   ;
ATTRIB S10CONNR LABEL = 'Percent Connections Remain'   FORMAT = 5.2       ;
ATTRIB S10CPUBY LABEL = 'Percent CPU Busy'             FORMAT = 5.2       ;
ATTRIB S10CPUIL  LABEL = 'Percent Cpu Idle'            FORMAT = 5.2       ;
ATTRIB S10CPUIO LABEL = 'Percent Cpu Io Busy'          FORMAT = 5.2       ;
ATTRIB S10DKIOE LABEL = 'Disk I/O Errs'                FORMAT = BEST12.   ;
ATTRIB S10DKIOR LABEL = 'Disk I/O Reads'               FORMAT = BEST12.   ;
ATTRIB S10DKIOW LABEL = 'Disk I/O Writes'              FORMAT = BEST12.   ;
ATTRIB S10IDLPR LABEL = 'Idle Processes'               FORMAT = BEST12.   ;
ATTRIB S10LK4GC LABEL = 'Locks 4GC'                    FORMAT = BEST12.   ;
ATTRIB S10LKRMN LABEL = 'Locks Remaining'              FORMAT = BEST12.   ;
ATTRIB S10MUPRC LABEL = 'Memory Used By Processes'     FORMAT = BEST12. ;
ATTRIB S10MRRDV LABEL = 'Mirrored Devices'             FORMAT = BEST12.   ;
ATTRIB S10NBLPR LABEL = 'Number of Blocked Processes'  FORMAT = BEST12. ;
ATTRIB S10NPROC LABEL = 'Number of Processes'          FORMAT = BEST12.   ;
ATTRIB S10PKTER LABEL = 'Number of Packet Errs'        FORMAT = BEST12.   ;
ATTRIB S10PKRCV LABEL = 'Number of Packets Rcvd'       FORMAT = BEST12.   ;
ATTRIB S10PKSNT LABEL = 'Number of Packets Sent'       FORMAT = BEST12.   ;
```

FIG. 8V

RUN;

PROC SUMMARY DATA = SYB;
BY NODE APP INSTANCE DATETIME DATE TIME HOUR;
ID QUARTER;
VAR S10BUSST S10BLPCS S10CONNR S10CPUBY S10CPUIL S10CPUIO
   S10DKIOE S10DKIOR S10DKIOW S10IDLPR S10LK4GC S10LKRMN
   S10MUPRC S10MRRDV S10NBLPR S10NPROC S10PKTER S10PKRCV
   S10PKSNT;
OUTPUT OUT= SYB
MEAN=S10BUSST S10BLPCS S10CONNR S10CPUBY S10CPUIL S10CPUIO
   S10DKIOE S10DKIOR S10DKIOW S10IDLPR S10LK4GC S10LKRMN
   S10MUPRC S10MRRDV S10NBLPR S10NPROC S10PKTER S10PKRCV
   S10PKSNT;

RUN;

***********************************************************************;

* BUILD THE USER PERFORMANCE DATA TABLE

***********************************************************************;

DATA USR;
SET USR1;
 KEEP
   APP DATE DATETIME HOUR INSTANCE NODE PARM QUARTER TIME
   USRNOSES USRNUMBR;

IF PARM= 'USRNoUser'   THEN USRNUMBR = METRIC;
ELSE IF PARM= 'USRNoSession'   THEN USRNOSES = METRIC;

ATTRIB DATETIME LABEL = 'Date Time Stamp'   FORMAT= DATETIME21.2 ;
ATTRIB DATE  LABEL= 'Date'         FORMAT = DATE9.   ;
ATTRIB TIME  LABEL = 'Time'        FORMAT = TIME10.2   ;
ATTRIB HOUR  LABEL = 'Hour'        FORMAT = Z2.   ;
ATTRIB QUARTER  LABEL = 'Quarter'     FORMAT = BEST12.  ;
ATTRIB INSTANCE  LABEL = 'Instance'    LENGTH = $35   ;
ATTRIB APP   LABEL = 'Application'   LENGTH = $15   ;
ATTRIB NODE  LABEL = 'Node'        LENGTH = $8    ;
ATTRIB USRNUMBR LABEL = 'Number of unique users currently logged'   ;
ATTRIB USRNUMBR LABEL = 'Number of active non-root user sessions'   ;

RUN;

PROC SUMMARY DATA = USR;
BY NODE APP INSTANCE DATETIME DATE TIME HOUR;
ID QUARTER;
VAR USRNOSES USRNUMBR;
OUTPUT OUT=USR
MEAN=USRNOSES USRNUMBR;
RUN;

QUIT;

FIG. 8W

| Patrol Parameter | ITSV Variable Name | Description |
|---|---|---|
| ACTPRCPUPerc | ACTPCPUP | % of CPU use for the selected active process. |
| ACTPRCPUTime | ACTPCCTM | Accumulated CPU time for the selected active process. |
| ACTPRDeltaCPU | ACTPRDCP | Change in CPU time since the last collection. |
| ACTPRMem | ACTPMMEM | Amount of memory the selected active process is consuming. |
| ACTPRMemWait | ACTPMEMW | Warns if the active process is waiting for memory. |
| ACTPRRank | ACTPRRNK | Rank of active processes. |
| CPUCpuUtil | CPUTIL | Percent CPU utilization |
| CPUIdleTime | CPIDLETIM | Percent of time CPU was Idle |
| CPUInt | CPUINT | # of non-VME device interrupts. |
| CPULoad | CPULOAD | 1-minute load average from the uptime command. |
| CPUProcSwch | CPUPSWCH | Total # of CPU context switches per second. |
| CPURunQSize | CPRUNQSZ | Average # of processes in the run |
| CPUSysTime | CPSYSTM | Percent of CPU time spent in system mode |
| CPUUserTime | CPUSERTM | Percent of CPU time spent in user mode |
| CPUWSwp | CPUWSWP | % of time the CPU spends waiting for swap I/O operations. |
| CPUWio | CPUWIO | % of time that the CPU spends waiting for I/O operations. |
| DSKAvgQueue | DSKAVGQ | Average # of disk I/O requests in the |
| DSKAvgServ | DSKAVGST | Average service time (ms), in which transfer requests are completed |
| DSKAvgWait | DSKAVGWT | Average time transfer requests wait in queue |
| DSKBps | DSKBPS | # of 1-KB blocks read from or written to the device per second. |
| DSKMsps | DSKMSPS | Average disk seek time for the device. |
| DSKPercentBusy | DSKPCBSY | Percent of time a the device is busy |
| DSKRead | DSKREAD | # of disk read requests per second. |
| DSKReadWrite | DSKRDWRT | # of read and write requests made to the device per second. |
| DSKSps | DSKSPS | # of disk seeks per second. |
| DSKTps | DSKTPS | # of disk transfers performed per second. |
| DSKWrite | DSKWRITE | # of KBs written to disk per second. |
| FSCapacity | FSCAPCTY | Percent of file system storage currently in |
| FSFreeInodes | FSFINODE | # of unused I-nodes on the local file system. |
| FSInodeUsedPercent | FSINPCTU | Percent of I nodes used |
| KERDirBlk | KERDIRBK | # of directory blocks read per second |
| KERFileUsedPercent | KERFLUPC | The % of Kernel file slots in use |
| KERGNodeUsedPercent | KERGNUSD | % of the kernel G-node slots being used. |
| KERIGet | KERIGET | # of files locate by an I-Node entry |
| KERINodeUsedPercent | KERINUPC | % of kernel I-node slots being used. |
| KERLgAlloc | KERLGALC | Memory in bytes allocated for large memory requests by KMA |
| KERLgFail | KERLGFAL | # of large memory pool requests that were not satisfied. |
| KERLgMem | KERLGMEM | Amount of memory in bytes available in the KMA |
| KERLockUsedPercent | KERLUPCT | % of the kernel lock slots being used. |
| KERMsg | KERMSG | # of message operations per second |
| KERNamei | KERNAMEI | # of file system pathname searches being performed. |
| KEROvzAlloc | KEROVALC | Amount of memory dynamically allocated for oversized requests. |

FIG. 10A

| Patrol Parameter | ITSV Variable Name | Description |
|---|---|---|
| KEROvzFail | KEROVFAL | # of requests for oversized memory that could not be satisfied. |
| KERProcUsedPercent | KERPUPCT | % of Kernel process slots used |
| KERSemOps | KERSEMOP | # of semephore operations per second |
| KERSmlAlloc | KERSMALC | Memory in bytes allocated to the small memory request pool |
| KERSmlFail | KERSMFAL | # of small memory requests that failed. |
| KERSmlMem | KERSMMEM | Memory (in bytes) available in the small memory request pool |
| KERSysCall | KERSYSCL | Total # of system calls per second |
| LOGFileSize | LOGFLSIZ | Size of the file being monitored. |
| MEMActiveVirPage | MEMACVPG | # of active virtual pages |
| MEMAddrTransFault | MEMADTRF | # of pages that were not in physical memory when accessed. |
| MEMAllocD | MEMALOCD | Amount of memory allocated to heap memory. |
| MEMBFree | MEMBFREE | Amount, in bytes, of heap memory freed per second. |
| MEMBRead | MEMBREAD | # of physical reads per sec from the disk to the buffer cache. |
| MEMBReq | MEMBREQ | Amount of memory requested per second by the heap. |
| MEMBWrt | MEMBWRIT | # of physical writes per sec to disk from the system buffer cache. |
| MEMBlkPerReq | MEMBPREQ | # of memory blocks searched per request. |
| MEMCache | MEMCACHE | # of page faults corrected by bringing pages in from the page cache. |
| MEMCow | MEMCOW | # of Copy On Write page faults |
| MEMCpyW | MEMCOPYW | # of page protection faults on shared copy-on-write pages. |
| MEMDFill | MEMDFILL | # of page faults due to demand |
| MEMFlush | MEMFLUSH | # single processor Translation Lookaside Buffer (TLB) flushes per sec |
| MEMFreeMem | MEMFREEM | # of 1 KB pages of memory available |
| MEMHeapMem | MEMHPMEM | # of 1-KB pages allocated to the system dynamic heap. |
| MEMIdGet | MEMIDGET | # of new Translation Lookaside Buffer (TLB) IDs issued per second. |
| MEMIdPrg | MEMIDPRG | # Translation Lookaside Buffer (TLB) IDs purged per sec/process. |
| MEMIdWrp | MEMIDWRP | # flushes per sec caused by depleted (TLB IDs. |
| MEMLRead | MEMLREAD | Logical blocks read per sec from system buffer |
| MEMLWrt | MEMLWRT | # of writes per sec to system buffer |
| MEMOverHd | MEMOVRHD | Amount of memory overhead for heap block management. |
| MEMPFault | MEMPFALT | # of detected page protection faults that caused pages to be copied. |
| MEMPRead | MEMPREAD | # of raw reads per sec from char devices |
| MEMPWrt | MEMPWRT | # of raw writes per sec to char devices |
| MEMPageAnticipated | MEMPGANT | Anticipated short |
| MEMPageFreed | MEMPGFRD | # 1-KB mem pages added to free list by the page-stealing daemon. |
| MEMPagein | MEMPGIN | # of 1 KB pages of memory swapped |
| MEMPageOut | MEMPGOUT | # of 1 KB pages of memory swapped |
| MEMPageScanned | MEMPSCND | # 1-KB mem pages scanned per sec by the page-stealing daemon |
| MEMPgFil | MEMPGFIL | # page faults reclaimed by bringing the pages in from the file system. |
| MEMPgSwp | MEMPGSWP | # page faults reclaimed by bringing pages in from the swap space. |
| MEMRCache | MEMRCACH | % of logical reads that are in the buffer cache. |
| MEMRFault | MEMRFALT | # of page reference faults per second. |
| MEMRegionsIn | MEMREGIN | # of 1-KB memory pages, or regions, that have been swapped in |
| MEMRegionsOut | MEMRGOUT | # of 1-KB memory pages, or regions, that have been swapped out |
| MEMReq | MEMREQ | # of memory allocation requests per second. |
| MEMSteal | MEMSTEAL | # of page protection faults on unshared writable pages. |
| MEMSwpBf | MEMSWPBF | # of swap buffer calls per second. |

FIG. 10B

| Patrol Parameter | ITSV Variable Name | Description |
|---|---|---|
| MEMSync | MEMSYNC | # Translation Lookaside Buffer (TLB) flushes per sec, all processors. |
| MEMTFault | MEMTFALT | # of user page table faults or kernel virtual address translation faults. |
| MEMUnused | MEMUNUSD | # of bytes of heap memory available for allocation. |
| MEMVmPrg | MEMVMPRG | # individual (TLB) entries purged per sec |
| MEMWCache | MEMWCACH | % of logical blocks written in the buffer cache. |
| MEMWire | MEMWIRE | Locked memory the # of 1 KB |
| MEMZero | MEMZERO | # of memory pages zero-filled on demand. |
| NETCollisionPrc | NETCOLPC | Percent of output attempts made by the host |
| NETInErrPrc | NETIERRP | Percent of incoming data packets containing |
| NETOutErrPrc | NETOERRP | Percent of outgoing data packets containing |
| NETPacketsOut | NETPKTSO | Total # on outgoing packets within a |
| NETPacketsIn | NETPKTSI | Total # on incoming packets within a |
| NFSCBadCall | NFSCBADC | Percent of NFS client calls that failed since |
| NFSCCall | NFSCCALL | # of NFS client calls made since |
| NFSCCreate | NFSCCRTE | % of all NFS client calls made to create a new file. |
| NFSCFsStat | NFSCFSST | % of all NFS client calls made to retrieve file attributes or files statistics. |
| NFSCGetAttr | NFSCGATR | % of all NFS client calls that are requests to get file attributes. |
| NFSCLink | NFSCLINK | % of all NFS client calls made to create hard links. |
| NFSCLookUp | NFSCLKUP | % of all NFS client calls made to look up directory paths. |
| NFSCMkDir | NFSCMKDR | % of all NFS client calls that are calls made to create directories. |
| NFSCNclGet | NFSCNCLG | # times the client had to request a new client handle for an NFS call. |
| NFSCNclSleep | NFSCNCLS | # times the kernel must wait to obtain client structure information. |
| NFSCNull | NFSCNULL | % of NFS client calls that request no action other than acknowledgment. |
| NFSCRead | NFSCREAD | % of all NFS client calls that are calls to read data from files. |
| NFSCReadDir | NFSCRDDR | % of all NFS client calls made to read directories. |
| NFSCReadLink | NFSCRDLK | % of NFS client calls made to read symbolic links. |
| NFSCRemove | NFSCRMVE | % of all NFS client calls made to remove files. |
| NFSCRename | NFSCRNME | % of all NFS client calls made to rename files. |
| NFSCRmDir | NFSCRMDR | % of all NFS client calls made to remove directories. |
| NFSCRpcBadCall | NFSCRBCL | # NFS client RPC calls |
| NFSCRpcBadXid | NFSCRBXI | % of client of all NFS server calls made to read symbolic links. |
| NFSSRemove | NFSSRMVE | % of all NFS server calls made to remove files. |
| NFSSRename | NFSSRNME | % of all NFS server calls made to rename files. |
| NFSSRmDir | NFSSRMDR | % of all NFS server calls made to remove directories. |
| NFSSRpcBadCall | NFSSRBCL | Percent of NFS RPC server requests rejected |
| NFSSRpcBadLen | NFSSRBLN | # of server RPC calls that are |
| NFSSRpcCall | NFSSRCAL | # of NFS server RPC calls since the |
| NFSSRpcNullRecv | NFSSNRCV | # of null RPC calls that the server received. |
| NFSSRpcXdrCall | NFSSRXCL | # of NFS server RPC calls whose |
| NFSSSetAttr | NFSSSATR | % of all NFS server calls made to store file attributes. |
| NFSSSymLink | NFSSSLNK | % of all NFS server calls made to create symbolic links. |
| NFSSWrite | NFSSWRTE | % of all NFS server calls made to write files. |
| PADeltaBetweenExecSecs | PADBEXSC | # of sec between executions. Value is the RUNQ_DELTA var. |
| PAInternalError | PAINTERR | # of miscellaneous internal errors. |
| PAOutstandingJobs | PAOUTSJB | # of currently exec jobs on the PATROL Agent & time started. |
| PATotalErrors | PATOTERR | Total # of errors detected by the PATROL Agent. |

FIG. 10C

| Patrol Parameter | ITSV Variable Name | Description |
|---|---|---|
| PAUserErrors | PAUSRERR | # of errors that have occurred in user-specified commands. |
| PAWorkRateExecsMin | PAWKRATE | # of instruction exec performed per min by the PATROL Agent. |
| PRNQLength | PRNQLNTH | # of print jobs waiting in the print queue. |
| PROCAvgUsrProc | PRCAUSRP | Average # of processes per non root |
| PROCExec | PRCEXEC | # of exec system calls per second. |
| PROCNoZombies | PRCNOZOM | Total # of zombie processes. |
| PROCNumProcs | PRCNUMPR | Total # of active processes on the system. |
| PROCProcWait | PRCWAIT | # of processes currently waiting for |
| PROCProcWaitInt | PRCPWTIN | # of processes in an interruptible wait state. |
| PROCProcWaitUnint | PRCPWTUN | # of processes in an uninterruptable wait state. |
| PROCTopProcs | PRCTOPPS | # of processes (up to a maximum of |
| PROCUserProcs | PRCUSERP | # of non root user processes |
| ProcNumProcs | PRCNUMP | # of active processes on the system |
| SMPContextSwitch | SMPCTXSW | # of CPU context switches. |
| SMPCrossCalls | SMPCXCLS | # of interprocessor cross-calls. |
| SMPIdlePercent | SMPIDLPC | Percent of time CPU was idle |
| SMPIntThread | SMPINTTR | # of interrupts as threads, excluding clock interrupts. |
| SMPInterrupts | SMPINTER | # of processor interrupts. |
| SMPInvContSwitch | SMPINVCX | # of processor involuntary context switches. |
| SMPMajorFaults | SMPMAJFT | # of major faults. |
| SMPMinorFaults | SMPMINFT | # of minor faults. |
| SMPRunQLen15Min | SMPRQ15M | Avg # of processes in CPU run queue during the last 15 minutes. |
| SMPRunQLen1Min | SMPRQ1MN | Avg # of processes in CPU run queue during the last minute. |
| SMPRunQLen5Min | SMPRQ5MN | Avg # of processes in CPU run queue during the last 5 minutes. |
| SMPSpinMutex | SMPSPNMX | # of spins on mutexes, or locks not acquired on the first try. |
| SMPSpinRdWr | SMPSPNRW | # of reader and writer locks not acquired on the first try. |
| SMPSystemCalls | SMPSYSCL | # of system calls. |
| SMPSystemPrcnt | SMPSYSPC | Amount of time spent on system activities |
| SMPThMigration | SMPTHMIG | # of thread migrations to another processor. |
| SMPUserPercent | SMPUSRPC | Amount of time spent on user requested |
| SMPWaitPercent | SMPWTPCT | Amount of processor time spent waiting. |
| SWPSwapFreeSpace | SWPSFRSP | Size of the available swap space. |
| SWPSwapSize | SWPSIZE | Size of a particular swap area. |
| SWPSwapUsedPercent | SWPUSDPC | % of swap space used for a particular swap area. |
| SWPTotSwapFreeSpace | SWPTOTFR | Size of the free swap space |
| SWPTotSwapSize | SWPTOTSZ | Size of the entire swap space |
| SWPTotSwapUsedPercent | SWPTOTUP | % of the entire swap space that is in use. |
| SWPnPageSizeAvail | SWPNPAVL | # of swap pages available on the |
| USRNoSession | USRNOSES | # of active nonroot user sessions currently on this machine. |
| USRNoUser | USRNUMBR | # of unique users currently logged |

META DATA PROCESSING FOR CONVERTING PERFORMANCE DATA INTO A GENERIC FORMAT

FIELD OF THE INVENTION

This invention relates to a device and method for evaluating computing capacity for institutions that employ multiple computers. More particularly, this invention relates to a generic data processing device and method for converting computer system performance data from a first format to a second format.

BACKGROUND OF THE INVENTION

Companies that own and operate computers for data processing encounter a need for capacity planning of computing resources, so that they can efficiently and accurately plan the purchasing of new computing resources. Computing resources include CPUs, memory, disk storage, tape storage, access devices, operating systems, file systems, and many others. Capacity planning relies on the accurate forecasting of resource utilization. Forecasting, in turn, requires analysis of current and historical system performance metrics data. These metrics include CPU utilization, disk storage utilization, memory utilization, memory allocation, file system access, and many others.

There are several issues of concern with regard to capacity planning. It is important for companies to be able to determine points at which new hardware will become necessary to meet system requirements. It is also important for companies to be able to project scenarios for potential configuration changes including both hardware and software. Another issue of concern is the monitoring and analysis of performance problems.

To address these and other needs, data analysis/reporting tools for analyzing, reporting, and graphing system performance data for the purposes of capacity forecasting and planning is currently commercially available. One such product that is widely used is SAS IT Service Vision software available from the SAS Institute, Inc. of Cary, N.C. However, performance data must be provided to SAS IT Service Vision in properly formatted SAS datasets. Likewise, specially formatted performance data is required by other commercially available data analysis software.

There are software products available, known as collection agents, that run on computers and collect raw performance data from computer resources. Examples of collection agents include Patrol available from BMC Corporation of Houston, Tex.; Unicenter TNG available from Computer Associates of Islandia, N.Y., BGS available from BMC Corporation, and Candle Availability Command Center from Candle Corporation. Most of the available collection agents may compile performance data into flat files known as Universal/Uniform Data Format (hereinafter UDF) files. A significant problem with available collection agents is the UDF files they produce are not properly formatted for use by data analysis/reporting tools such as SAS IT Service Vision. Furthermore, different types of collection agents may compile UDF files having different arrangements, using different variables and sequential ordering of variables. Data from the UDF files must be appropriately processed to produce properly formatted datasets that may be read and used by data analysis/reporting tools.

Heretofore, it has been necessary to process data from each type of collection agent in a unique way to produce properly formatted datasets. Often, a customized data processing program had to be written for each collection agent. Further complicating this task is the fact that a single UDF file contains data for many different types of performance metrics; these data must be sorted out into individual dataset tables for input to data analysis/reporting tools such as SAS IT Service Vision.

Accordingly, there is a need for single integrated product that can read performance data from many different types of collection agents and convert that performance data into properly formatted SAS datasets for use by data analysis/reporting tools irrespective of the type of collection agent that produced the performance data.

SUMMARY OF THE INVENTION

The present invention is a data processor for processing performance metric data. The invention functions as a generic interface that facilitates communication between any one of a number of collection agents and data analysis/reporting tools.

In accordance with an aspect of the invention, computer system metrics performance data contained in UDF files is converted into SAS datasets for input to data analysis/reporting tools such as SAS IT Service Vision.

In accordance with another aspect of the invention, data processing may be performed by identifying the source of the UDF file received, transposing the UDF file data into properly formatted records, sorting the records into individual tables in accordance with the type of metrics reported, and providing the dataset to the data analysis/reporting tool.

In accordance with still another aspect of the invention, an apparatus is provided for converting performance metric data from UDF files to a format readable by data analysis/reporting tools such as SAS IT Service Vision. The apparatus includes a data processor programmed to retrieve UDF files from various collection agents that may be resident on computers. Each UDF file includes several records that contain performance metric data for the computers and the performance metric data is separated into various fields. The data processor is further programmed to reformat the UDF files, map each UDF file to a dataset and sort the dataset by grouping the records/observations of the dataset by field/attribute. The data processor is additionally programmed to build performance data tables using the sorted dataset.

In accordance with yet another aspect of the invention, a system for processing and analyzing performance metric data is provided. The system includes a number of nodes, e.g., computers, where each computer has a collection agent. The collection agents collect performance metric data from the computers and compile the performance metric data into UDF files. A data analysis computer is provided that retrieves UDF files from the collection agents and selects those UDF files produced by the same type of collection agent. The data analysis computer then reformats the selected UDF files and maps the reformatted files to a dataset. The dataset is then sorted by grouping the records/observations by field/attribute, unique datetime stamp, and performance data tables are built by the data analysis computer using the sorted dataset. The performance data tables are in this case SAS datasets, however, Oracle, Sybase, Informix, DB2, SQLServer, or any other database product may be used.

An advantage of the present invention is that it provides a single, generic handshake interface between different collection agents and data analysis/reporting tools. The invention is not proprietary and does not rely on any specific vendor's collection agent or computer hardware. Using the present invention, companies can efficiently provide services such as capacity planning and other forecasting and diagnostic services to their customers who may use different collection agents. This reduces the burden placed on customers to obtain an interface that will appropriately process performance metric data collected by the customer's collection agent. In addition, it simplifies the task of the service provider and allows it to confidently market its services to a wide variety of customers irrespective of the type of collection agent or computer hardware the customers employ.

A more specific advantage of the invention is that by processing the performance metric data into SAS datasets, the volume of performance metric data input to the data analysis product is reduced by as much as a factor of four from prior art systems.

BRIEF DESCRIPTION OF THE DRAWINGS

FIG. 2 depicts a comma-delimited UDF file produced by a collection agent.

FIGS. 7A, 7B and 7C represent the code for performing the process depicted in FIG. 4.

FIGS. 8A, 8B, 8C, 8D, 8E, 8F, 8G, 8H, 8I, 8J, 8K, 8L, 8M, 8N, 8O, 8P, 8Q, 8R, 8S, 8T, 8U, 8V and 8W represent the code for performing the process illustrated in FIGS. 5 and 6.

FIGS. 10A, 10B, 10C and 10D depict UNIX system metrics.

DETAILED DESCRIPTION OF THE DRAWINGS

Figure 1:
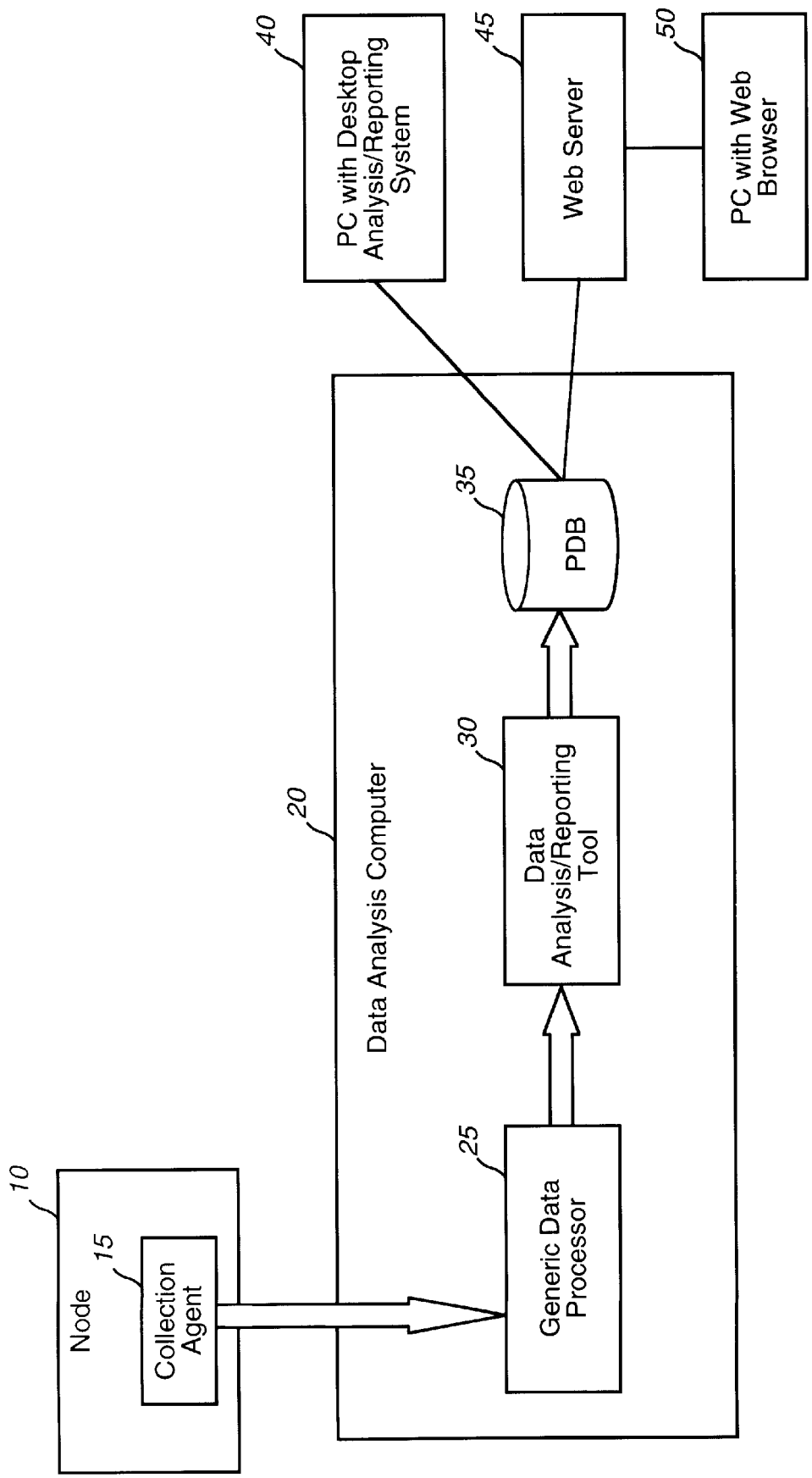
FIG. 1 illustrates a block diagram of a system architecture in accordance with the invention.

The present invention is a generic data processor for converting data, particularly performance metric data, into a form readable by data analysis/reporting tools such as SAS IT Service Vision. FIG. 1 illustrates a system in accordance with a preferred embodiment of the present invention. In the system, capacity forecasting and planning services are provided for the computing resources embodied by a plurality of nodes 10. In the preferred embodiment, the nodes 10 are computers such as UNIX, Windows NT and PC based workstations. A proprietary collection agent 15 runs on each node 10. Collection agents 15 collect raw performance data or performance metric data from the computer resources. These data include CPU utilization, memory utilization and allocation, storage device utilization and allocation, and other types of metrics. Exemplary UNIX system metrics are depicted in FIGS. 10A–10D. Examples of collection agents 15 that may be used in the system include the aforementioned Patrol, Unicenter TNG, Candle, and BGS.

Collection agents 15 compile the raw performance data and writes them into flat files known as Universal/Uniform Data Format (UDF) files. A single UDF file may contain performance data for many different types of metrics. The UDF files produced by collection agents 15 are similar in that they include data values for system performance metrics, along with data identifying the source of the metrics. In addition, the data values are arranged in character delimited records, preferably linear comma or linear tab delimited records. However, the UDF files may differ in the specific variables used and the sequential ordering of variables. As used herein, the term "variable" refers to specific performance values of the records.

An example of a comma-delimited UDF file produced by a collection agent is depicted in FIG. 2. This particular example was produced by BMC's Patrol. Each line represents a record of a metric collected. Each record comprises the following fields:

Node—computer/processor/machine from which the metric was taken or to which themetric is attributed; in the first line in the FIG. 2 example, node="normet09".

Application—application or resource from which the metric was taken or to which the metric is attributed; in the first line in the FIG. 2 example, application="DISK". Other examples are CPU, File System, memory, network, etc.

Instance—identifies specific instance of resource (application) that the metric came from; in the first line in the FIG. 2 example, instance="cl Otl 00", which identifies a specific DISK.

Parameter—type of metric collected (i.e., CPU utilization) for the specified application; in the first line in the FIG. 2 example, parameter="DSKMsps".

Date—date the metric was collected; in the first line in the FIG. 2 example, date="1997-12-01".

Time—system timestamp of when the metric was collected; in the first line in the FIG. 2 example, time="06:07:23". In FIG. 2, date and time are actually one field, since no comma delimits them. Parsing can separate them into two fields.

Metric—the actual metric, representing the payload data; in the first line in the FIG. 2 example, metric=1".

An input UDF file typically comprises these or similar fields, although these fields may be arranged in different orders and have different formats, depending on the specific collection agent. The data contained in the fields may be in a flat file, with records delimited by characters, e.g., commas, tabs, spaces, or the like.

The UDF files are transmitted to a data analysis computer 20 for processing. The UDF files are processed so they may be read by the data analysis/reporting tool 30. In the preferred embodiment, the data analysis computer 20 is a UNIX Midrange Server. However, the data analysis computer 20 may be a mainframe, an NT server, PC's, phone system, fax machine, or any other machine capable of storing or writing performance data. Preferably, the UDF files are transmitted via File Transfer Protocol (FTP) over an Internet Protocol (IP) WAN. However, other methods of transferring files may be used.

In keeping with an aspect of the invention, a generic data processor 25 is operatively engaged with the data analysis computer 20. The generic data processor 25 receives each UDF file, reads the first line of the UDF file and determines the specific arrangement of data contained therein. The type of collection agent 15 that produced the data may be determined from the arrangement of the data. The generic data processor 25 comprises program code that identifies the UDF formats of prespecified versions and types of commercially available collection agents 15. The generic data processor 25 then transposes and reformats the performance metric data and sorts the reformatted performance metric data into individual tables referred to as Performance Data Tables for each type of metric reported. The resulting Performance Data Tables are suitable for input into data analysis/reporting tool 30. Preferably the Performance Data Tables are in the form of SAS datasets.

The SAS datasets are then input to the data analysis/reporting tool 30, in the preferred embodiment SAS IT Service Vision. The SAS IT Service Vision integrates the performance data into daily, weekly, yearly, etc., groups of data; stores data in a Performance Database 35 (PDB); and produces graphical displays of performance data that are useful for capacity forecasting and planning. Reports and data views from the PDB may be retrieved by any known method. A PC 40 running Desktop SAS can access it directly over a LAN/WAN, or a Web Server 45 can provide an interface over an IP network for PCs with Web Browsers such as PC 50.

Figure 3:
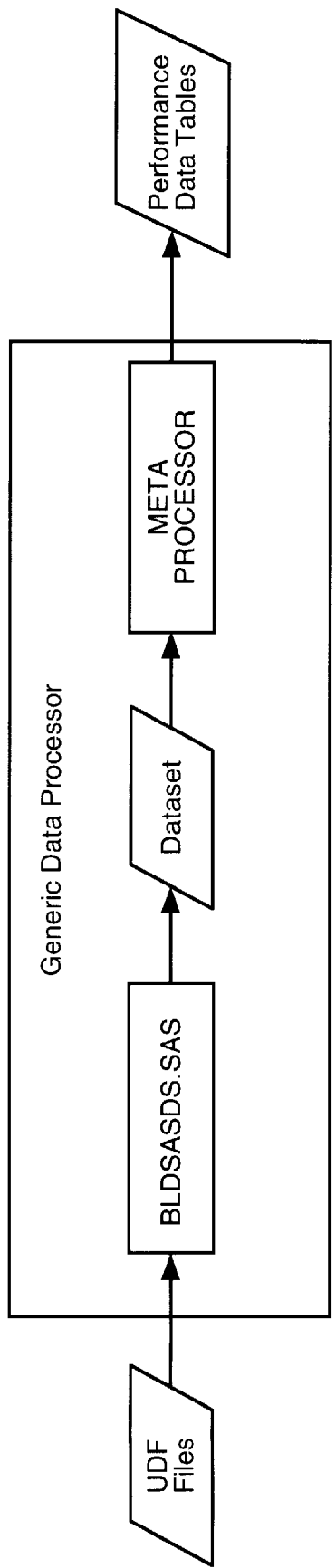
FIG. 3 shows process architecture for a generic data processor in accordance with the invention.

Turning now to more specific operational aspects of the invention, FIG. 3 illustrates the process architecture of the generic data processor 25. Generic data processor 25 is preferably comprised of two SAS programs resident on the data analysis computer 20. The first program, referred to herein as BLDSASDS, receives UDF input files 55, parses the data contained in the files, and builds an SAS output dataset 60 by mapping input data fields to specific attributes of the output SAS dataset 60. Other attributes are derived. These attributes are:

NODE mapped from node field in input UDF file
APP mapped from application field in input UDF file
INSTANCE mapped from instance field in input UDF file
PARM mapped from parameter field in input UDF file
DATE mapped from date field in input UDF file
TIME mapped from time field in input UDF file
HOUR derived from time field in input UDF file
METRIC mapped from metric field in input UDF file
DATETIME derived by concatenating date and time fields in input UDF file
QUARTER derived by dividing hour into four segments
ZONE derived from date and hour fields; represents shift during the week. Three zones are defined.

It should be noted that records of UDF files correspond to observations of SAS datasets. In addition, fields of UDF files correspond to attributes of SAS datasets.

The first program BLDSASDS produces one output SAS dataset 60 for multiple UDF input files 55; the multiple UDF files 55 that result in a single output SAS dataset 60 are produced by the same type of collection agent (e.g., BMC Patrol), but represent different time segments and can come from multiple nodes (computers). In the preferred embodiment, BLDSASDS collects all UDF files for a single date from a single type of collection agent, and produces a single SAS dataset.

The second program, referred to herein as META PROCESSOR, takes the output SAS dataset 60 built by BLDSASDS and produces multiple Performance Data Tables 65. In the preferred embodiment the Performance Data Tables 65 are in the form of an SAS dataset that is formatted for SAS IT Service Vision. Further, a Performance Data Table 65 is built for each "APP" attribute value.

Figure 4:
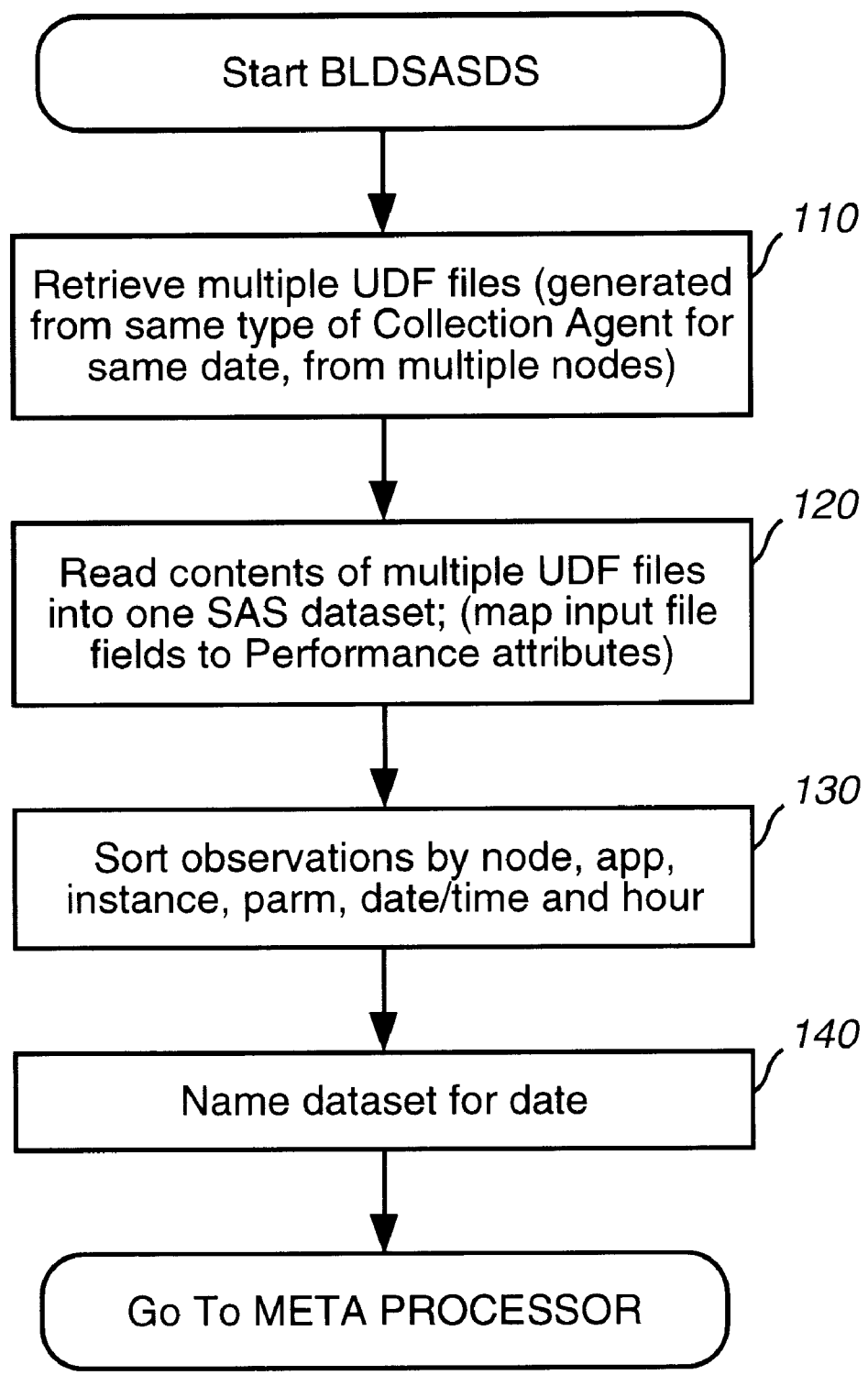
FIG. 4 is a flowchart illustrating the operation of a first program module in accordance with the invention.

A flowchart for BLDSASDS is shown in FIG. 4. FIG. 7 depicts the SAS code for BLDSASDS. In step 110, BLDSASDS reads multiple UDF input files 55 from a specified directory on the data analysis computer 20 on which BLDSASDS runs. Based on the specific arrangement of data, BLDSASDS identifies the collection agent 15 that produced each UDF file. The first program, BLDSASDS then retrieves multiple UDF input files that are produced by the same type of collection agent 15. Preferably, these multiple UDF files 55 represent a single day's data that have been collected by the same type of collection agent (e.g., BMC Patrol) for multiple nodes.

In step 120, BLDSASDS reads the textual contents of each UDF file 55 produced by the same type of collection agent 15 and builds an output SAS dataset 60 from these contents. Each line of the UDF file 55 is parsed into input fields, based on comma-delimiters or other pre-programmed rules. Each input field of a record in the UDF file 55 is then mapped to a specific attribute of a record in the output SAS dataset 60 (SAS records are referred to as observations). Other attributes are then calculated, as described in reference to FIG. 3.

In step 130, BLDSASDS sorts the observations in the output SAS dataset 60 by specific attribute sort order, i.e., by "NODE", "APP", "INSTANCE", "DATE", and "HOUR". BLDSASDS also removes duplicate observations.

In step 140, BLDSASDS names the output SAS dataset 60 for the date on which the metrics were collected. The dataset 60 is then ready for the META PROCESSOR.

Figure 5:
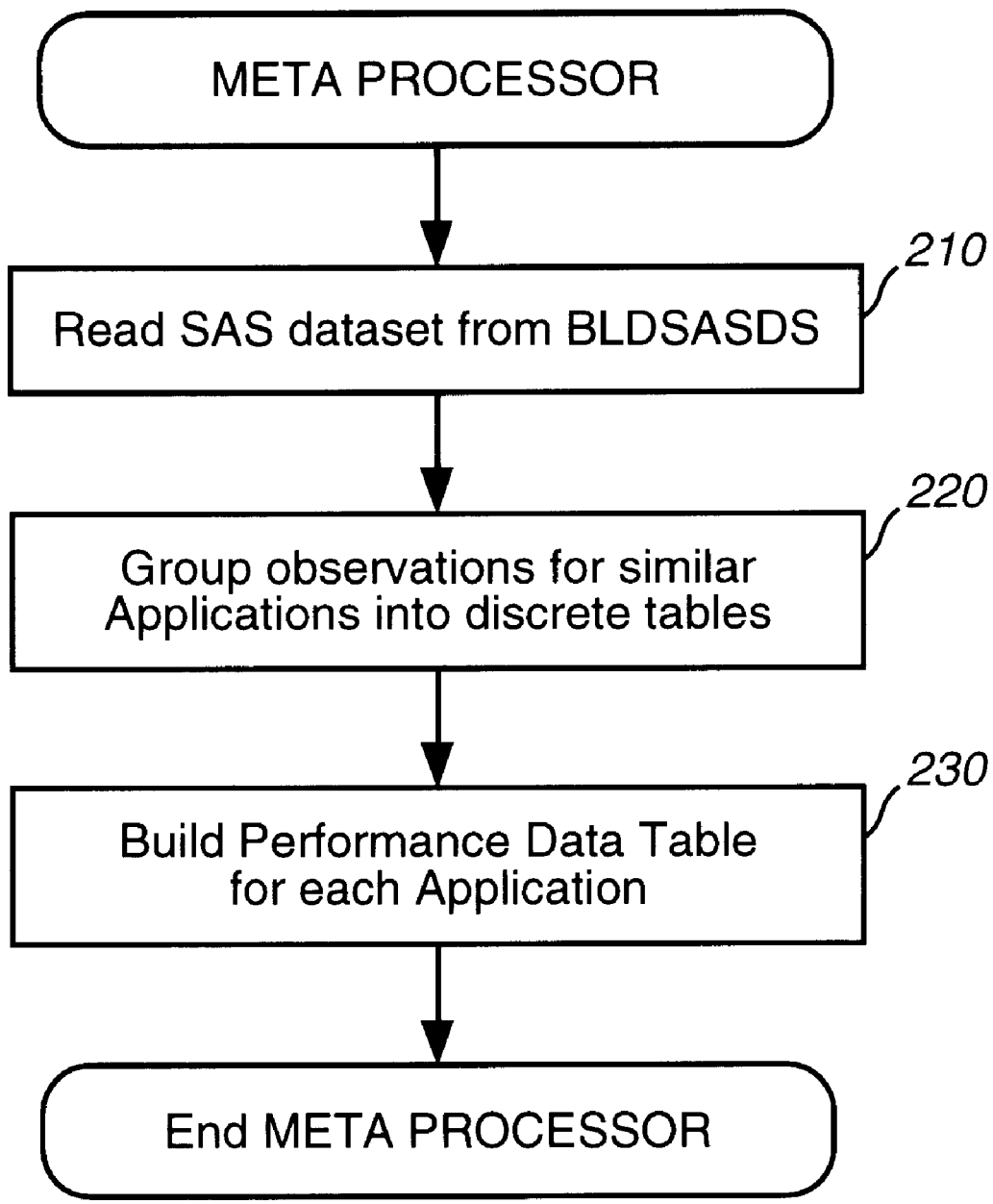
FIG. 5 is a flowchart illustrating the operation of a second program module in accordance with the invention.

FIG. 5 is a flowchart illustrating the process performed by the META PROCESSOR. FIG. 8 depicts the SAS code for the META PROCESSOR. In step 210, the META PROCESSOR reads the output SAS dataset 60 produced by BLDSASDS. In step 220, the META PROCESSOR groups observations that have the same "APP" field into discrete tables. The output of the META PROCESSOR is multiple Performance Data Tables 65, with each table containing performance data for a single "APP".

In step 230, the META PROCESSOR builds a Performance Data Table 65 for each value of "APP". For example, a Performance Data Table 65 is built for metrics on CPU, disk, file system, kernel, memory, network, NFS, Oracle, Patrol Agent, total Processes, Active Processes, SMP, SWAP, Sybase, and User. As shown in the META PROCESSOR source code in FIG. 8, a process may be performed for each "APP" Performance Data Table 65. These processes are similar.

Figure 6:
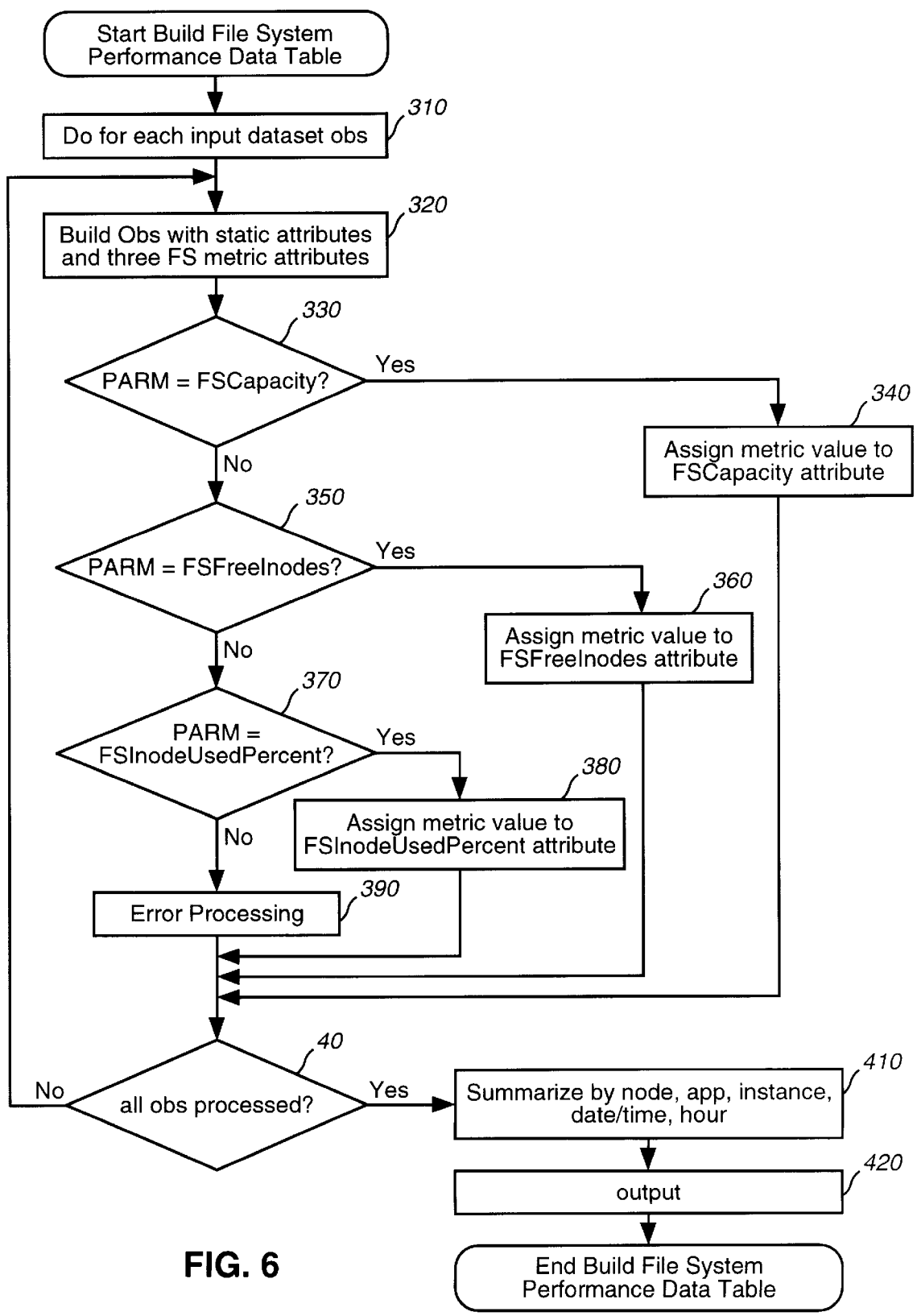
FIG. 6 is a flowchart illustrating the operation of a third program module in accordance with the invention.

FIG. 6 is a flowchart illustrating the sub-process of step 230 of FIG. 5. By way of example, FIG. 6 is directed to building a Performance Data Table for the File System metric. However, as illustrated in FIG. 8, similar processes may be employed for building Performance Data Tables 65 for other metrics. Step 310 indicates that this process is performed on each observation of the Performance Data Table 65. In step 220 of FIG. 5, all observations for APP=FILESYSTEM are grouped into a distinct table. In the sub-process of FIG. 6, each observation in this table is acted upon, and is referred to as the input observation. Output observations are created by the META PROCESSOR for the Performance Data Table dataset.

In step 320 an observation for the output Performance Data Table dataset is built by keeping static attributes from the input dataset; these attributes include "APP", "DATE", "DATETIME", "HOUR", "INSTANCE", "NODE", "PARM", "QUARTER", and "TIME". Three additional attributes are created: "FSCAPCTY", "FSFINODE", and "FSINPCTU". These represent the three types of metrics collected for the File System application. Other applications (values of "APP" attribute) will have different numbers of metric types collected. The metric type collected is indicated in the "PARM" attribute.

In the next three steps, the value of the "METRIC" attribute in the input observation is assigned to one of the three attributes created in step 320, in accordance with the value of the "PARM" attribute in the input observation. More particularly, in step 330, if the value of the "PARM" attribute of the input observation is equal to "FSCapacity", then the value of the "METRIC" attribute is assigned to "FSCAPCTY" in the output observation in step 340. Here, "FSCAPACITY" represents the capacity of the file system. If the value of the "PARM" attribute does not equal "FSCapacity" then the process proceeds to step 350.

In step 350, if the value of the "PARM" attribute of the input observation is equal to "FSFreeInodes", then the value of the "METRIC" attribute is assigned to "FSFINODE" in the output observation in step 360. Here, "FSFINODE" represents the number of free I-nodes. If the value of the "PARM" attribute does not equal "FS FreeInodes" then the process proceeds to step 370.

In step 370, if the value of the "PARM" attribute of the input observation is equal to "FSInodeUsedPercent", then the value of the "METRIC" attribute is assigned to "FSINPCTU" in the output observation in step 380. Here, "FSINPCTU" represents the number of free I-nodes. If the value of the "PARM" attribute does not equal "FSInodeUsedPercent" then the process proceeds to step 390.

Step 390 is an optional error processing step that may be performed when the "PARM" attribute of the input observation does not equal any of the values set forth in steps 330, 350 or 370. This error processing step may include defaulting the output observation to a pre-defined value or string, and continuing with the next observation.

In step 400, a check is performed to determine whether all observations have been processed. If they have not, then the process returns to step 320. If they have, then step 410 is performed whereby the processed observations are summarized by NODE, APP, INSTANCE, DATETIME, DATE, TIME, and HOUR. The META PROCESSOR then outputs the Performance Data Table in step 420.

It should be noted that all Performance Data Tables built by the META PROCESSOR in step 230 of FIG. 5 are provided to the data analysis/reporting tool 30 in an appropriate format for further processing. The data analysis/reporting tool 30 may then produce reports and graphs for a display containing a variety of system information that is of significant value to Information Technology professionals.

In the preferred embodiment of the present invention, the nodes 10 are UNIX-based midrange computers, such as DEC Alpha servers and IBM RS/6000 computers. However, in alternate embodiments, the nodes 10 may comprise other computers using different operating systems and hardware configurations. In further alternate embodiments, the nodes 10 may comprise other information devices including networks, phone systems, fax machines, or other devices capable of storing or writing performance related data.

Figure 9:
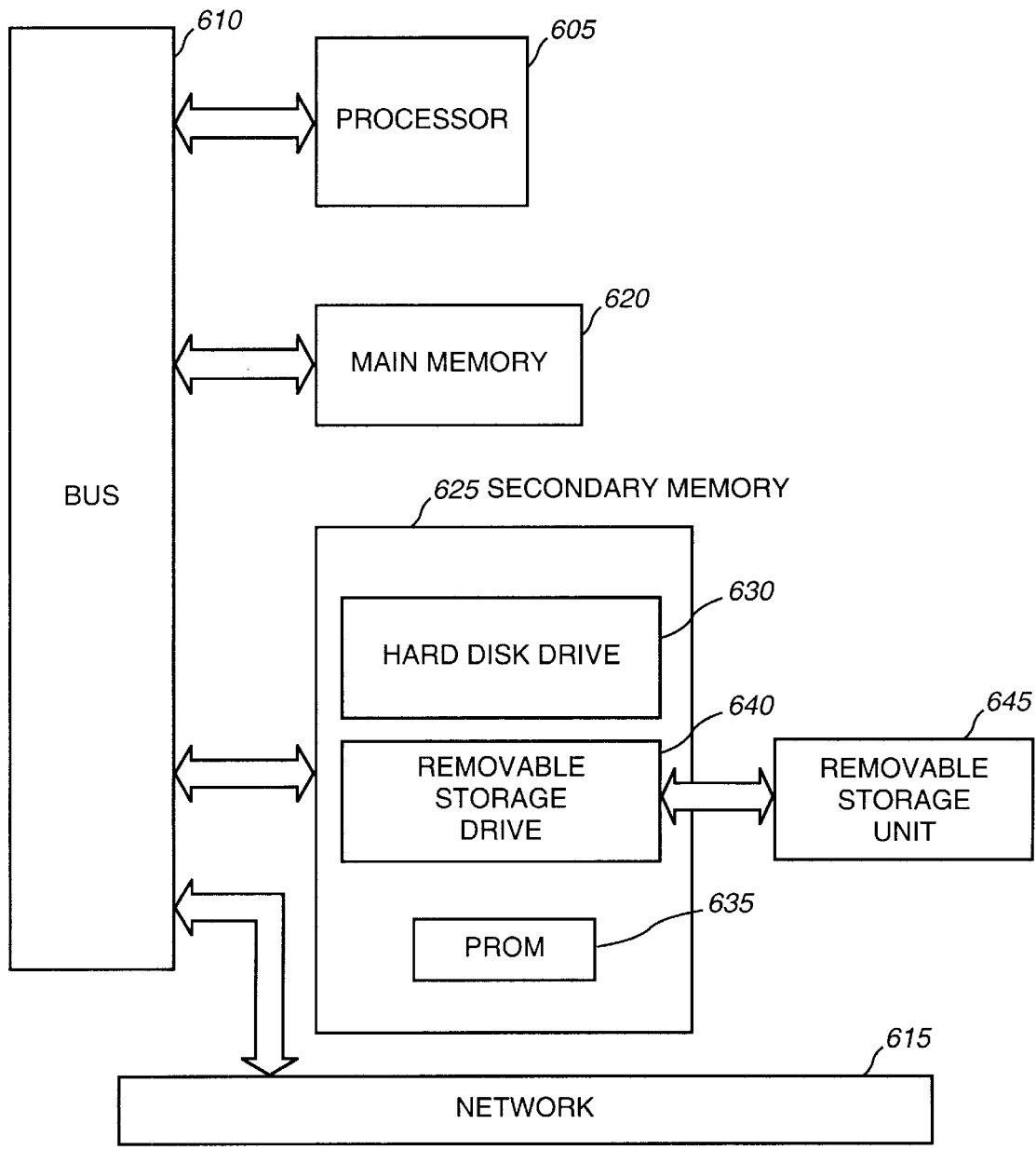
FIG. 9 shows an exemplary computer system for use in the present invention.

The data analysis computer 20 employed in the preferred embodiment is an IBM AIX RS 6000 UNIX server illustrated in FIG. 9. An EMC disk array (not shown) having 270 GB of storage may be attached to the server. The data analysis computer 20 is not limited to a UNIX system. The data analysis computer 20 could be a PC, a mainframe, Windows NT workstation, or any other computing device.

The data analysis computer 20 includes one or more processors 605. Processor 605 is connected to command bus 610. The data analysis computer 20 may communicate with other systems such as PC 40 or web server 45 via a network 615.

Data analysis computer 20 also includes a main memory 620, preferably random access memory (RAM), and a secondary memory 625. Secondary memory 625 includes, for example, a hard disk drive 630, a PROM 635 and/or a removable storage drive 640, representing a floppy disk drive, magnetic tape drive, a compact disk drive, etc. Removable storage drive 640 reads from and/or writes to a removable storage unit 645 in a well known manner.

Removable storage unit 645, also called a program storage device or a computer program product, represents a floppy disk, magnetic tape, compact disk, etc. As will be appreciated, removable storage unit 645 includes a computer usable storage medium having stored therein computer software and/or data.

Computer programs (also called computer control logic), such as BLDSASDS and the META PROCESSOR are stored in main memory and/or secondary memory 625. Such computer programs, when executed, enable data analysis computer 20 to perform the features of the present invention as discussed herein. In particular, the computer programs, when executed, enable generic data processor 25 to perform significant features of the present invention. Accordingly, such computer programs represent controllers of the data analysis computer 20.

In an alternate embodiment, the invention is directed to a computer program product comprising a computer readable medium having control logic (computer software) stored therein. The control logic, when executed by the generic data processor 25, causes the generic data processor 25 to perform the functions described herein.

While various embodiments of the present invention have been described, it should be understood that they have been presented by way of example only, and not limitation. While the present invention is particularly suited to function as an interface between available collection agents and SAS IT Service Vision software, it is not limited to this function. The invention may be used to convert performance metric data from a variety of collection agents to datasets. These datasets may be used by SAS IT Service Vision or any other appropriate data analysis/reporting tool. Further, any type of performance data can be processed. Metrics collected by database collection agents and network collection agents may be used as well as those collected by UNIX collection agents. Thus, the breadth and scope of the present invention should not be limited by any of the above-described exemplary embodiments, but should be defined only in accordance with the following claims and their equivalents.

We claim:

1. In a computer, a method for converting performance metric data, produced by a plurality of types of collection agents resident on a plurality of nodes, from UDF files to a second format, said method comprising:

retrieving a plurality of UDF files from a corresponding plurality of collection agents, each UDF file including a plurality of records containing performance metric data corresponding to one of the plurality of nodes, the performance metric data being separated into a plurality of fields;

selecting UDF files produced by one of the plurality of collection agents;

reformatting each UDF file and mapping each UDF file to a first dataset;

sorting the first dataset including grouping the records by attribute; and building a plurality of performance data tables using the sorted first dataset.

2. The method for converting performance metric data of claim 1 wherein reformatting each UDF file includes parsing the data fields of each record and mapping the parsed data fields to a plurality of attributes.

3. The method for converting performance metric data of claim 2 wherein said selection step precedes said retrieving step.

4. The method of claim 2 wherein said retrieving step precedes said selection step.

5. The method for converting performance metric data of claim 2 wherein the plurality of attributes include NODE.

6. The method for converting performance metric data of claim 2 wherein the plurality of attributes include APP.

7. The method for converting performance metric data of claim 2 wherein sorting the first dataset includes selecting records from the first data set and grouping the selected records into discrete tables wherein the selected records each have a first one of the plurality of attributes and wherein a value of the first one of the plurality of attributes is the same for each selected record.

8. The method for converting performance metric data of claim 7 wherein the first one of the plurality of attributes is APP.

9. The method for converting performance metric data of claim 3 wherein the plurality of retrieved UDF files are produced by one or more of the plurality of nodes.

10. The method for converting performance metric data of claim 3 wherein at least one of the plurality of retrieved UDF files includes performance metric data from a first time segment and another one of the plurality of retrieved UDF files includes performance metric data from a second time segment.

11. The method for converting performance metric data of claim 10 wherein the first time segment is different from the second time segment.

12. The method for converting performance metric data of claim 10 wherein building the plurality of performance data tables includes:
    (a) selecting at least one of the discrete tables and reading the records of the at least one discrete table,
    (b) constructing output records by (i) combining a selected first group of the plurality of attributes with a selected second group of the plurality of attributes, the second group being selected according to the value of the value of the first one of the plurality of attributes, and (ii) for each record of the at least one data table, mapping a value of a second one of the plurality of attributes to one of the second group of attributes according to a value of a first one of the first group of attributes, and
    (c) summarizing the output records according to a third group of the plurality of attributes.

13. The method for converting performance metric data of claim 12 wherein the first group of the plurality of attributes includes APP, DATE, DATETIME, HOUR, INSTANCE, NODE, PARM QUARTER, and TIME.

14. The method for converting performance metric data of claim 13 wherein the first one of the first group of attributes is PARM.

15. The method for converting performance metric data of claim 14 wherein the second one of the plurality of attributes is METRIC.

16. An apparatus for converting performance metric data from a plurality of nodes, produced by a plurality of types of collection agents resident on said plurality of nodes, from UDF files to a second format, said apparatus comprising:
    a data processor programmed to:
    retrieve a plurality of UDF files from a corresponding plurality of collection agents, each UDF file including a plurality of records comprising performance metric data corresponding to one of the plurality of nodes, the performance metric data being separated into a plurality of fields;
    reformat each UDF file and map each UDF file to a first data set;
    sort the first dataset including group the records by attribute; and build a plurality of performance data tables using the sorted first dataset.

17. The apparatus of claim 16 wherein said data processor is programmed to reformat each UDF file by parsing the data fields of each record and mapping the parsed data fields to a plurality of attributes.

18. The apparatus of claim 17 wherein said data processor is programmed to sort the first dataset by selecting records from the first data set and grouping the selected records into discrete tables wherein the selected records each have a first one of the plurality of attributes and wherein a value of the first one of the plurality of attributes is the same for each selected record.

19. The apparatus of claim 18 wherein said data processor is programmed to build the plurality of performance data tables by:
    (a) selecting at least one of the discrete tables and reading the records of the at least one discrete table,
    (b) constructing output records by (i) combining a selected first group of the plurality of attributes with a selected second group of the plurality of attributes, the second group being selected according to the value of the value of the first one of the plurality of attributes, and (ii) for each record of the at least one data table, mapping a value of a second one of the plurality of attributes to one of the second group of attributes according to a value of a first one of the first group of attributes, and
    (c) summarizing the output records according to a third group of the plurality of attributes.

20. The apparatus of claim 17 wherein the plurality of retrieved UDF files are produced by one of the plurality of types of collection agents.

21. The apparatus of claim 20 wherein the plurality of retrieved UDF files include performance metric information for a selected date.

22. The apparatus of claim 20 wherein the plurality of retrieved UDF files are produced by one or more of the plurality of nodes.

23. The apparatus of claim 20 wherein at least one of the plurality of retrieved UDF files includes performance metric data from a first time segment and another one of the plurality of retrieved UDF files includes performance metric data from a second time segment.

24. The apparatus of claim 23 wherein the first time segment is different from the second time segment.

25. A computer program product comprising a computer useable medium having program logic recorded thereon for use with a data processor to convert performance metric data, produced by a plurality of collection agents, from UDF files to a second format, the plurality of collection agents being resident on a plurality of nodes, said computer program logic comprising:
    computer readable means for retrieving a plurality of UDF files from a corresponding plurality of collection agents, each UDF file including a plurality of records containing performance metric data corresponding to one of the plurality of nodes, the performance metric data being separated into a plurality of fields;
    computer readable means for reformatting each UDF file and mapping each UDF file to a first data set;
    computer readable means for sorting the first dataset including grouping the records by attribute; and
    computer readable means for building a plurality of performance data tables using the sorted first dataset.

26. The computer program product of claim 25 wherein said computer readable reformatting means includes means for parsing the data fields of each record and for mapping the parsed data fields to a plurality of attributes.

27. The computer program product of claim 26 wherein said computer readable means for sorting includes computer readable means for selecting records from the first data set and grouping the selected records into discrete tables wherein the selected records each have a first one of the plurality of attributes and wherein a value of the first one of the plurality of attributes is the same for each selected record.

28. The computer program product of claim 27 wherein said computer readable means for building includes:

(a) computer readable means for selecting at least one of the discrete tables and reading the records of the at least one discrete table, (b) computer readable means for constructing output records by (i) combining a selected first group of the plurality of attributes with a selected second group of the plurality of attributes, the second group being selected according to the value of the value of the first one of the plurality of attributes, and (ii) for each record of the at least one data table, mapping a value of a second one of the plurality of attributes to one of the second group of attributes according to a value of a first one of the first group of attributes, and (c) summarizing the output records according to a third group of the plurality of attributes.

29. A system for processing and analyzing performance metric data for input to a data analysis/reporting tool, said system comprising:

a plurality of nodes, each node having a collection agent that collects performance metric data and compiles the performance metric data into UDF files, each UDF file including a plurality of records containing performance metric data corresponding to one of said plurality of nodes, the performance metric data being separated into a plurality of fields; and a data analysis computer including a data processor programmed to:

retrieve a plurality of UDF files from a corresponding plurality of collection agents, each UDF file including a plurality of records containing performance metric data corresponding to one of the plurality of nodes, the performance metric data being separated into a plurality of fields;

select the UDF files produced by one of the plurality of collection agents;

reformat each UDF file and map each UDF file to a first data set;

sort the first dataset including group the records by attribute;

and build a plurality of performance data tables using the sorted first dataset.

30. The system of claim 29 wherein the plurality of nodes include a plurality of computers.

31. The apparatus of claim 30 wherein said data processor is programmed to reformat each UDF file by parsing the data fields of each record and mapping the parsed data fields to a plurality of attributes.

32. The apparatus of claim 31 wherein said data processor is programmed to sort the first dataset by selecting records from the first data set and grouping the selected records into discrete tables wherein the selected records each have a first one of the plurality of attributes and wherein a value of the first one of the plurality of attributes is the same for each selected record.

33. The apparatus of claim 32 wherein said data processor is programmed to build the plurality of performance data tables by:

(a) selecting at least one of the discrete tables and reading the records of the at least one discrete table, (b) constructing output records by (i) combining a selected first group of the plurality of attributes with a selected second group of the plurality of attributes, the second group being selected according to the value of the value of the first one of the plurality of attributes, and (ii) for each record of the at least one data table, mapping a value of a second one of the plurality of attributes to one of the second group of attributes according to a value of a first one of the first group of attributes, and (c) summarizing the output records according to a third group of the plurality of attributes.

34. The apparatus of claim 31 wherein the plurality of retrieved UDF files are produced by one of the plurality of types of collection agents.

35. The apparatus of claim 34 wherein the plurality of retrieved UDF files include performance metric information for a selected date.

36. The apparatus of claim 34 wherein the plurality of retrieved UDF files are produced by one or more of said plurality of nodes.

37. The apparatus of claim 34 wherein at least one of the plurality of retrieved UDF files includes performance metric data from a first time segment and another one of the plurality of retrieved UDF files includes performance metric data from a second time segment.

38. The apparatus of claim 37 wherein the first time segment is different from the second time segment.

\* \* \* \* \*